US009556285B2

(12) United States Patent
Iwase et al.

(10) Patent No.: US 9,556,285 B2
(45) Date of Patent: Jan. 31, 2017

(54) CATALYST COMPOSITION FOR POLYMERIZING CONJUGATED DIENE MONOMER

(71) Applicant: Asahi Kasei Chemicals Corporation, Tokyo (JP)

(72) Inventors: Katsuhiro Iwase, Tokyo (JP); Yuji Kosugi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 204 days.

(21) Appl. No.: 14/376,076

(22) PCT Filed: Jan. 30, 2013

(86) PCT No.: PCT/JP2013/052028
§ 371 (c)(1),
(2) Date: Jul. 31, 2014

(87) PCT Pub. No.: WO2013/115242
PCT Pub. Date: Aug. 8, 2013

(65) Prior Publication Data
US 2014/0378620 A1    Dec. 25, 2014

(30) Foreign Application Priority Data

Jan. 31, 2012  (JP) .................. 2012-019082
Jan. 31, 2012  (JP) .................. 2012-019085

(51) Int. Cl.
*C08F 4/52*    (2006.01)
*C08F 4/54*    (2006.01)
*C08F 4/605*   (2006.01)
*C08F 136/06*  (2006.01)

(52) U.S. Cl.
CPC . *C08F 4/52* (2013.01); *C08F 4/54* (2013.01); *C08F 4/605* (2013.01); *C08F 136/06* (2013.01)

(58) Field of Classification Search
CPC ............. C08F 136/06; C08F 4/52; C08F 4/54; C08F 4/605
USPC ................. 525/333.2; 502/117; 526/185, 189
See application file for complete search history.

(56) References Cited

U.S. PATENT DOCUMENTS

| | | | |
|---|---|---|---|
| 4,242,232 A | 12/1980 | Sylvester et al. | |
| 4,444,903 A | 4/1984 | Carbonaro et al. | |
| 5,484,897 A | 1/1996 | Garbassi et al. | |
| 5,633,353 A | 5/1997 | Garbassi et al. | |
| 6,596,828 B1 | 7/2003 | Kaito et al. | |
| 2005/0170951 A1 | 8/2005 | Kaita et al. | |
| 2006/0058179 A1 | 3/2006 | Kaita et al. | |
| 2008/0188613 A1 | 8/2008 | Tanaka et al. | |
| 2009/0203828 A1 | 8/2009 | Kurazumi et al. | |
| 2010/0190940 A1 | 7/2010 | Nakagawa et al. | |
| 2010/0317794 A1 | 12/2010 | Tanaka et al. | |
| 2011/0263803 A1 | 10/2011 | Suzuki et al. | |
| 2013/0345376 A1* | 12/2013 | Luo ........................ C08F 10/00 526/130 |

FOREIGN PATENT DOCUMENTS

| | | |
|---|---|---|
| CN | 101384659 A | 3/2009 |
| EP | 0007027 B1 | 12/1982 |
| JP | S58-067705 A | 4/1983 |
| JP | H07-070143 A | 3/1995 |
| JP | H07-112989 A | 5/1995 |
| JP | 2000-313710 A | 11/2000 |
| JP | 2003-292513 A | 10/2003 |
| JP | 2004-027103 A | 1/2004 |
| JP | 2005-015579 A | 1/2005 |
| JP | 2007-063240 A | 3/2007 |
| JP | 2008-291096 A | 12/2008 |
| TW | 200704659 A | 2/2007 |
| WO | 2007/094370 A | 8/2007 |
| WO | 2008/078814 A | 7/2008 |
| WO | 2010/074255 A | 7/2010 |

OTHER PUBLICATIONS

Arndt et al. (Cationic Yttrium Methyl Complexes as Functional Models for Polymerization Catalysts of 1,3-Dienes, Angew. Chem. Int. Ed. 2005, 44, 7473-7477).*
Short et al., "Effect of CIS-TRANS Ratio on the Physical Properties of 1,4 Polybutadienes," Rubber Chemistry and Technology, 30: 1118-1141 (1957).
Kuran "Principles of Coordination Polymerisation: Heterogeneous and homogeneous catalysis in polymer chemistry-polumerisation of hydrocarbon, heterocyclic and heterounsaturated monomers," Principles of Coordination Polymerisation, 275-311 (2001).
Nuyken, ed. "Neodymium Based Ziegler Catalysts—Fundamental Chemistry," Advances in Polymer Science, 132-133 (2006).
Fischbach et al., "Stereospecific Polymerization of Isoprene with Molecular and MCM-48—Grafted Lanthanide (III) Tetraalkylaluminates," Angewandte Chemie International Edition, 43: 2234-2239 (2004).
Zimmermann et al., "Homoleptic Rare-Earth Metal (III) Tetramethylaluminates: Structural Chemistry, Reactivity, and Performance in Isoprene Polymerization," Chemistry: A European Journal, 13: 8784-8800 (2007).
Arndt et al., "Cationic Yttrium Methyl Complexes as Functional Models for Polymerization of Catalysts of 1,3-Dienes," Angewandte Chemie International Edition, 44: 7473-7477 (2005).
Meermann et al., "Rare-Earth Metal Mixed Chloro/Methyl Compounds: Heterogeneous-Homogeneous Borderline Catalysts in 1,3-Diene Polymerization," Angewandte Chemie, 119: 6628-6633 (2007).

(Continued)

*Primary Examiner* — Ling Choi
*Assistant Examiner* — Chun-Cheng Wang
(74) *Attorney, Agent, or Firm* — Morgan, Lewis & Bockius LLP

(57) ABSTRACT

There is provided a catalyst composition for polymerizing a conjugated diene monomer containing a rare earth complex having a specific structure and a specific compound.

14 Claims, No Drawings

(56) References Cited

OTHER PUBLICATIONS

International Search Report issued in corresponding International Patent Application No. PCT/JP2013/052028 dated Apr. 23, 2013.

International Preliminary Report on Patentability with Written Opinion issued in corresponding International Patent Application No. PCT/JP2013/052028 dated Aug. 5, 2014.

European Search Report issued in corresponding European Patent Application No. 13743175.5 dated Sep. 24, 2014.

* cited by examiner

CATALYST COMPOSITION FOR POLYMERIZING CONJUGATED DIENE MONOMER

TECHNICAL FIELD

The present invention relates to a catalyst composition for polymerizing a conjugated diene monomer.

BACKGROUND ART

Conjugated diene polymers are used as raw material rubbers in a variety of fields. For example, conjugated diene polymers are widely used in tires because these polymers advantageously provide treads having high resistance to wear and high flexibility at low temperatures and carcasses having low heat-generating properties and high flex crack resistance.

Among these, it is known that natural rubber having a cis-1,4-bond content (hereinafter also referred to as "cis content") of approximately 100% and conjugated diene polymers having high tacticity such as polybutadienes having a cis-1,4-bond content of 98% or more are crystallized during drawing to attain high tensile strength (for example, Non-Patent Literature 1). These highly tactic conjugated diene copolymers have been produced with a coordination polymerization catalyst. A variety of catalyst systems such as Ti, Co, and Ni has been known. Conjugated diene polymers having a high cis content have been also produced with these catalyst systems in an industrial scale (for example, Non-Patent Literature 2).

In the late 1970s, systems using rare earth catalysts such as rare earth carboxylates have been proposed. Typically, the rare earth carboxylate catalyst systems have a cis content of approximately 94 to 97%. These catalyst systems have higher polymerization activity than those of the traditional Co, Ni, and Ti catalysts at a polymerization temperature of 60 to 80° C. or more. For this reason, these catalyst systems enable polymerization at higher temperatures and have narrower molecular weight distribution, which are characteristics not found in the traditional catalyst systems (for example, Patent Literatures 1 and 2 and Non-Patent Literature 3).

As an attempt to increase the cis content, a system using a binuclear complex of a rare earth element and alkylaluminum has been proposed, which has shown high cis selectivity at a cis content of 99% or more in the polymerization of isoprene (Non-Patent Literature 4).

Another rare earth binuclear complex has been proposed, which is prepared by a reaction of a binuclear complex of a rare earth element coordinated with toluene and alkylaluminum halide with alkylaluminum, and attains polymers having a cis content of 88 to 98.8% (for example, Patent Literature 3).

Furthermore, a system using a metallocene complex of a rare earth element has been proposed. This system attains polymers having a cis content of 96 to 100% (for example, Patent Literatures 4 to 8).

CITATION LIST

Patent Literature

Patent Literature 1: European Patent No. 0007027
Patent Literature 2: Japanese Patent Laid-Open No. S58-067705
Patent Literature 3: Japanese Patent Laid-Open No. H7-112989
Patent Literature 4: Japanese Patent Laid-Open No. 2008-291096
Patent Literature 5: Japanese Patent Laid-Open No. 2007-63240
Patent Literature 6: Japanese Patent Laid-Open No. 2004-27103
Patent Literature 7: Japanese Patent Laid-Open No. 2003-292513
Patent Literature 8: Japanese Patent Laid-Open No. 2000-313710

Non-Patent Literature

Non-Patent Literature 1: Rubb. Chem. Technol. 30, 1118 (1957)
Non-Patent Literature 2: Principles of Coordination Polymerization 275
Non-Patent Literature 3: Neodymium Based Ziegler Catalysts Fundamental Chemistry 132
Non-Patent Literature 4: Angew Chem. Int. Ed. 2004 43 2234

SUMMARY OF INVENTION

Technical Problem

Unfortunately, the traditionally known catalyst systems have the following problems.

First, the polymerization systems using a complex of a transition metal such as Ti, Ni, and Co as the catalyst system described in Non-Patent Literature 2 need to undergo polymerization for a long time at a low polymerization temperature in order to attain a desired cis content (96 to 98%). This requires a facility to cool the production process system. A monomer recycling system is required in the production process because the conversion rates of monomers are low, i.e., 70 to 90%. As above, the polymerization systems using a complex of a transition metal such as Ti, Ni, and Co as the catalyst system requires a larger number of facilities and a larger amount of energy than those required in the production process of other conjugated diene polymers.

Although the rare earth catalyst systems described in Patent Literatures 1 and 2 and Non-Patent Literature 3 simplify the production process and have higher polymerization activity, the cis content is usually approximately 94 to 97%. To increase the cis content, the polymerization needs to be performed by reducing the polymerization temperature to 10° C. or less. In this case, a problem is that a reduction in the polymerization temperature causes a reduction in polymerization activity.

The systems using binuclear complexes of rare earth elements and alkylaluminum described in Non-Patent Literature 4 show high cis selectivity at a cis content of 99% or more in polymerization of isoprene. These systems are used at a polymerization temperature of 25° C. and attain a conversion rate of 99% for a polymerization time of 15 minutes. A large amount of the catalyst approximately 10 times the amount of the carboxylic acid system is needed. The activities of the systems are not always higher than those of other catalyst systems.

In the systems prepared by a reaction of a binuclear complex of a rare earth element coordinated with toluene and alkylaluminum halide with a alkylaluminum, as described in Patent Literature 3, those having high polymerization activity have a low cis content of less than 98% while those having a cis content of more than 98% have a low polymerization rate. These systems do not attain a cis content of 99% or more, and have insufficient performance as catalyst systems.

Furthermore, in the rare earth metallocene systems described in Patent Literatures 4 to 8, those having high polymerization activity have a low cis content of 96 to 97%. Some systems have a high cis content depending on the polymerization conditions and types of catalysts. The systems having a cis content of 99%, for example, need a polymerization time of 18 hours at a polymerization temperature of 0° C. It has been reported that systems having a cis content of 99% or more are prepared by polymerization at a polymerization temperature of 25° C. for one hour. In this case, a large amount of the catalyst is used, and the conversion rate per hour is low, i.e., 60%. The systems having a cis content of 100% are prepared by polymerization at −20° C. for 5 days, and the conversion rate is 48%, which is not at a level for practical use.

As above, it turns out that the cis content and catalyst activity are mutually contradictory in the existing catalyst systems. In other words, the catalyst systems having high polymerization activity have a low cis content and those having a high cis content have low polymerization activity. No catalyst system enabling preparation of polymers having a cis content of 98% or more and having higher polymerization activity than ever has been found yet.

An object of the present invention is to provide a catalyst composition for polymerizing a conjugated diene monomer that enables polymerization under higher temperature conditions than ever and can produce a polymer having a high cis content.

Solution to Problem

The present inventors, who have conducted extensive research to solve the problems, have found that a composition comprising a rare earth complex having a specific structure and a specific compound can solve the problems, and have completed the present invention.

Namely, the present invention is as follows.

[1] A catalyst composition for polymerizing a conjugated diene monomer, comprising components (a) and (b), wherein the component (a) is a lanthanoid-aluminum crosslinked complex having a structure represented by the following formula (1) or (2):

[Formula 1]

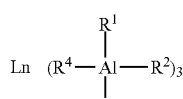

(1)

[Formula 2]

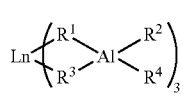

(2)

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group; and the component (b) is an alkylaluminum compound represented by a formula $H_nAlR^{10}_{3-n}$ wherein $R^{10}$ may be the same or different, and represents an alkyl group having 1 to 8 carbon atoms or an alkenyl group having 1 to 8 carbon atoms; and n represents an integer of 0 to 3.

[2] The catalyst composition for polymerizing the conjugated diene monomer according to [1], further comprising one or more compounds (c) selected from the group consisting of metal halide compounds and halosilyl compounds.

[3] The catalyst composition for polymerizing the conjugated diene monomer according to [1] or [2], further comprising one or more compounds (d) selected from the group consisting of aluminum oxy compounds represented by the following formula (3) or (4):

[Formula 3]

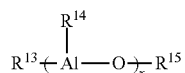

(3)

[Formula 4]

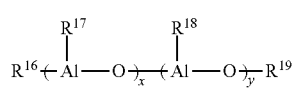

(4)

wherein $R^{12}$ to $R^{19}$ may be the same or different, and represent a hydrogen atom or an alkyl group having 1 to 8 carbon atoms; and x and y represent an integer of 1 to 10000, and/or borane compounds and borate compounds.

[4] The catalyst composition for polymerizing the conjugated diene monomer according to any of [1] to [3], wherein the alkylaluminum compound comprises a compound represented by a formula $H_nAlR^{20}_{3-n}$ wherein $R^{20}$ represents an alkyl group having 1 to 8 carbon atoms; and n represents an integer of 0 to 3.

[5] The polymerization catalyst composition according to any of [1] to [3], wherein the alkylaluminum compound comprises diisobutylaluminum hydride or triisobutylaluminum.

[6] The polymerization catalyst composition according to any of [2] to [5], wherein the metal halide compound comprises an aluminum halide compound.

[7] The polymerization catalyst composition according to any of [3] to [6], wherein the aluminum oxy compound comprises methylaluminoxane.

[8] A catalyst composition for polymerizing a conjugated diene monomer, comprising components (a), (c), and (d), wherein the component (a) is a lanthanoid-aluminum crosslinked complex having a structure represented by the following formula (1) or (2):

[Formula 5]

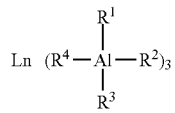

(1)

-continued

[Formula 6]

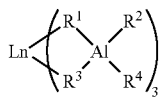
(2)

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group, the component (c) is one or more compounds selected from the group consisting of metal halide compounds and halosilyl compounds, and the component (d) is one or more compounds selected from the group consisting of aluminum oxy compounds represented by the following formula (3) or (4):

[Formula 7]

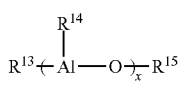
(3)

[Formula 8]

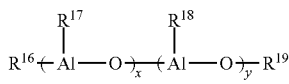
(4)

wherein $R^{13}$ to $R^{19}$ may be the same or different, and represent a hydrogen atom or an alkyl group having 1 to 8 carbon atoms; and x and y represent an integer of 1 to 10000, and/or borane compounds and borate compounds.

[9] The polymerization catalyst composition according to [8], wherein the metal halide compound comprises an aluminum halide compound.

[10] The polymerization catalyst composition according to [8] or [9], wherein the aluminum oxy compound comprises methylaluminoxane.

[11] A method of producing a polydiene compound having a cis-1,4-bond content of 98% or more, comprising:

a step of polymerizing a conjugated diene monomer with the polymerization catalyst composition according to any of [1] to [10].

[12] A method of producing a polydiene compound, comprising:

a step of polymerizing a conjugated diene monomer with the polymerization catalyst composition according to any of [1] to [10], and reacting the resultant polymer with a compound comprising one selected from the group consisting of a carbonyl group, an imide group, and an epoxy group.

[13] A polydiene compound produced with the catalyst composition according to any of [1] to [10], wherein a cis-1,4-bond content measured by an NMR method is 98% or more, a ratio of a trans-1,4-bond content to a 1,2-vinyl bond content is within the range of 18:1 to 1:1, a weight average molecular weight (Mw) is within the range of 250000 to 2500000, and weight average molecular weight (Mw)/number average molecular weight (Mn)=1.4 to 3.5.

[14] A modified polydiene compound produced with the catalyst composition according to any of [1] to [10], wherein a cis-1,4-bond content measured by an NMR method is 98% or more, a ratio of a trans-1,4-bond content to a 1,2-vinyl bond content is within the range of 18:1 to 1:1, a weight average molecular weight (Mw) is within the range of 250000 to 2500000, weight average molecular weight (Mw)/number average molecular weight (Mn)=1.4 to 3.5, and a rate of introduction of functional groups into a polymer terminal is 40 to 100%.

Advantageous Effects of Invention

The present invention can provide a catalyst composition for polymerizing a conjugated diene monomer that can provide polymers having a high cis content and that has high polymerization activity. Use of the polymerization catalyst composition according to the present invention can efficiently provide a conjugated polydiene having a high cis content of 98% or more under higher temperature conditions than ever.

DESCRIPTION OF EMBODIMENTS

Hereinafter, embodiments for implementing the present invention (hereinafter simply referred to as "present embodiment") will be described in detail. The present invention will not be limited to present embodiments below, and can be modified in various ways within the scope of the gist to be implemented.

First Embodiment

The polymerization catalyst composition according to first embodiment (present embodiment 1) is a catalyst composition for polymerizing a conjugated diene monomer comprising components (a) and (b), wherein the component (a) is a lanthanoid-aluminum crosslinked complex having a structure represented by the following formula (1) or (2):

[Formula 9]

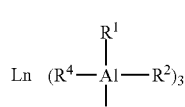
(1)

[Formula 10]

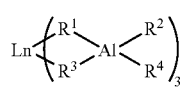
(2)

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group; and the component (b) is an alkylaluminum compound represented by the formula $H_nAlR^{10}{}_{3-n}$ wherein $R^{10}$ may be the same or different, and represents an alkyl group having 1 to 8 carbon atoms or an alkenyl group having 1 to 8 carbon atoms; and n represents an integer of 1 to 3.

The polymerization catalyst composition according to present embodiment 1 may further comprise one or more compounds (c) selected from the group consisting of metal halide compounds and halosilyl compound.

The polymerization catalyst composition according to present embodiment 1 may further comprise one or more compounds (d) selected from the group consisting of aluminum oxy compounds represented by the following formula (3) or (4):

[Formula 11]

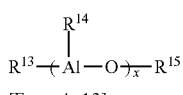

(3)

[Formula 12]

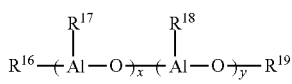

(4)

wherein $R^{13}$ to $R^{19}$ may be the same or different, and represent a hydrogen atom or an alkyl group having 1 to 8 carbon atoms; and x and y represent an integer of 1 to 10000, and/or borane compounds and borate compounds.

From structure analysis with X rays, the lanthanoid-aluminum crosslinked complex according to present embodiment 1 is found to have the structure represented by the formula (2). Actually the structure represented by the formula (2) represents a structure at an extremely low temperature or at an instant. At room temperature, the alkyl group (and other functional groups) in the formula (2) undergoes exchange reaction at a considerably high speed. In the formula (2), $R^1$ and $R^3$ bind to Ln and Al. Actually, any R, that is, $R^1$ and $R^3$ at an instant, $R^2$ and $R^4$ at the next instant, and then $R^3$ and $R^4$ repeat bonding and exchange to form the structure represented by the formula (1). At an extremely low temperature, slow exchange of R forms the structure represented by the formula (2). Then, when the state at room temperature is observed by NMR or the like, usually two peaks, that is, a peak of $R^1$ and $R^3$ and a peak of $R^2$ and $R^4$ are found in the structure represented by the formula (2). However, the substituents are exchanged so fast as described above, so that one peak appears in the middle of the two peaks. In short, this crosslinked complex can also be represented in the form of the structure represented by the formula (1) as if four R bind to Al and three functional groups represented by ($AlR_4$) bind to Ln. At an extremely low temperature, two peaks are observed due to slow exchange of R. The structure represented by the formula (1) represents the state of the complex at room temperature while the structure represented by the formula (2) represents the state of the complex at an extremely low temperature or an instant. Although the complex represented by the formula (1) is the same as the complex represented by the formula (2), the complex is properly represented by the formula (1) from the results of NMR analysis, and is properly represented by the formula (2) from the results by structure analysis with X rays.

The polymerization catalyst composition according to present embodiment 1 may be used in any conjugated diene monomer, and conjugated dienes having any structure such as linear dienes, cyclic dienes, and dienes having substituents may be used. Specific examples thereof include 1,3-butadiene, 1,3-isoprene, 1,4-dimethyl-1,3-butadiene, 1,2-di-methyl-1,3-butadiene, 1,3-dimethyl-1,3-butadiene, 1,2,3-trimethyl-1,3-butadiene, cyclohexadiene, 1-vinylcyclohexene, 1,3,5-hexatriene, and alloocimene.

Component (a)

In present embodiment 1, the lanthanoid-aluminum crosslinked complex (a) has a structure represented by the following formula (1) or (2):

[Formula 13]

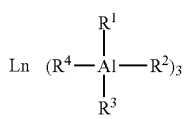

(1)

[Formula 14]

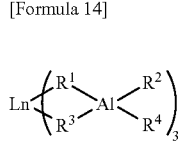

(2)

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group.

The structures represented by the formulae (1) and (2) are expressed by chemical formulae $Ln(AlR_4)_3$ and $Ln[(\mu-R_2)AlR_2]_3$, respectively.

Examples of a specific structure of the lanthanoid-aluminum crosslinked complex include structures represented by the following formulae (5) to (11) and (5)' to (11)':

[Formula 15]

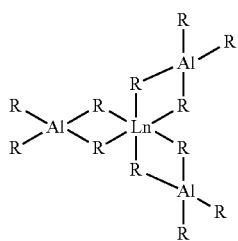

(5)

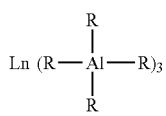

(5)'

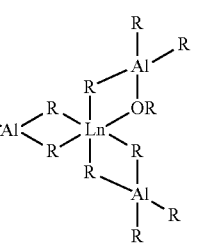

(6)

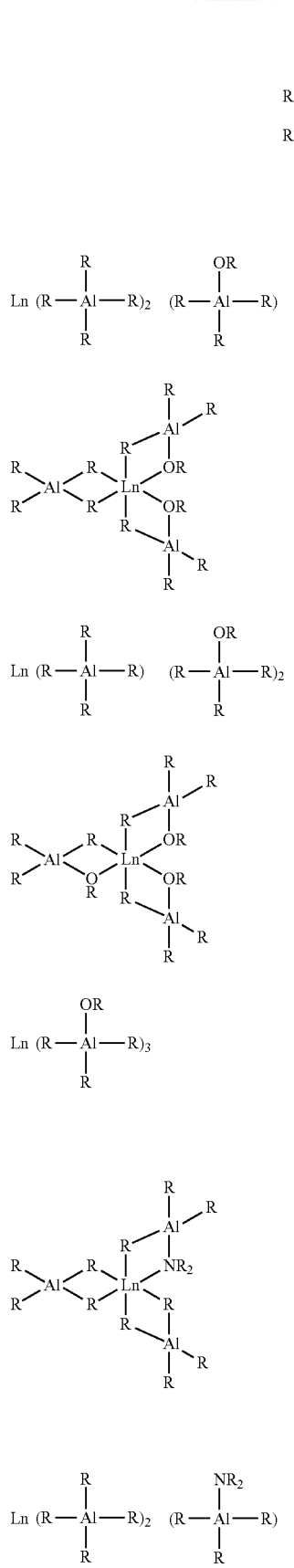

wherein R represents one selected from the group consisting of a hydrogen atom and an alkyl group having 1 to 8 carbon atoms.

Like in the structure represented by the formula (6), in the structures represented by the formulae (7) to (11), groups binding to both Ln and Al and groups binding to Al can be exchanged for each other.

These lanthanoid-aluminum crosslinked complexes may be used singly or in combinations of two or more.

Any lanthanoid element represented by Ln can be used without limitation, and La, Ce, Pr, Nd, Sm, Eu, Gd, Tb, and Dy are preferable, and La, Ce, Pr, Nd, Gd, Tb, and Dy are more preferable because these will attain a high cis content.

Specific examples of the alkyl group having 1 to 8 carbon atoms include a methyl group, an ethyl group, a propyl group, an isopropyl group, a butyl group, an isobutyl group, a t-butyl group, a pentyl group, an isopentyl group, a cyclopentyl group, a hexyl group, a cyclohexyl group, a phenyl group, a methylphenyl group, a pentyl group, an octyl group, and a 2-ethylhexyl group. Among these, a methyl group, an ethyl group, a propyl group, an isopropyl group, a butyl group, an isobutyl group, a t-butyl group, a cyclopentyl group, a cyclohexyl group, a phenyl group, and a methylphenyl group are preferable, and a methyl group, an ethyl group, a propyl group, an isopropyl group, a butyl group, and an isobutyl group are more preferable because of high stability of the complex and high solubility in a solvent.

Specific examples of the alkylsilyl group include a trimethylsilyl group, a dimethylsilyl group, a trimethoxysilyl group, and a triethoxysilyl group. Among these, a trimethylsilyl group and a dimethylsilyl group are preferable from the viewpoint of the stability of the complex and ease of synthesis.

Specific examples of the alkyloxy group include a methyloxy group, an ethyloxy group, a propyloxy group, an isopropyloxy group, a butyloxy group, an isobutyloxy group, a t-butyloxy group, a pentyloxy group, a neopentyloxy group, a hexyloxy group, a cyclohexyloxy group, a 2-ethylhexyloxy group, a phenoxy group, a 2,6-di-t-butylphenoxy group, a 2,6-di-isobutylphenoxy group, a 2,6-diisopropylphenoxy group, a 2,4,6-tri-t-butylphenoxy group, a 2,4,6-tri-isobutylphenoxy group, a 2,4,6-triisopropylphenoxy group, and a 2,6-di-t-butyl-4-methylphenoxy group. Among these, a methyloxy group, an ethyloxy group, a propyloxy group, an isopropyloxy group, a butyloxy group, an isobutyloxy group, a t-butyloxy group, a 2,6-di-t-butylphenoxy group, a 2,6-di-isobutylphenoxy group, a 2,6-diisopropylphenoxy group, a 2,4,6-tri-t-butylphenoxy group, a 2,4,6-tri-isobutylphenoxy group, a 2,4,6-triisopropylphenoxy group, and a 2,6-di-t-butyl-4-methylphenoxy group are preferable from the viewpoint of the stability of the complex and ease of synthesis.

Specific examples of the dialkylamide group include a dimethylamide group, a diethylamide group, a dipropylamide group, a diisopropylamide group, a dibutylamide group, a diisobutylamide group, a bistrimethylsilylamide group, and a bisdimethylsilylamide group. Among these, a dimethylamide group, a diethylamide group, a diisopropylamide group, a bistrimethylsilylamide group, and a bisdimethylsilylamide group are preferable from the viewpoint of the stability of the complex and ease of synthesis.

Component (b)

In present embodiment 1, the alkylaluminum compound is represented by the formula $H_nAlR^{10}{}_{3-n}$. Here, $R^{10}$ may be the same or different, and represents an alkyl group having 1 to 8 carbon atoms or an alkenyl group having 1 to 8 carbon atoms; and n represents an integer of 1 to 3.

The alkylaluminum compound preferably comprises a compound represented by the formula $H_nAlR^{20}{}_{3-n}$ wherein $R^{20}$ represents an alkyl group having 1 to 8 carbon atoms, and n represents an integer of 1 to 3.

Specific examples of the alkylaluminum compound in present embodiment 1 include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, and isobutylaluminum dihydride. Among these, diisobutylaluminum hydride and triisobutylaluminum are preferable because of stabilization of active species.

Component (c)

Specific examples of the metal halide compound in present embodiment 1 include aluminum halide compounds such as dimethylaluminum chloride, methylaluminum dichloride, diethylaluminum chloride, ethylaluminum dichloride, and ethylaluminum sesquichloride; titanium tetrachloride, tin tetrachloride, and tin dichloride. Specific examples of the halosilyl compound include silicon tetrachloride, trimethylchlorosilane, methyldichlorosilane, dimethyldichlorosilane, and methyltrichlorosilane. These metal halide compounds and halosilyl compounds may be used singly or in combinations of two or more. Besides the compounds above, phosphorus trichloride, benzoyl chloride, and t-butyl chloride may be included.

Component (d)

In present embodiment 1, the component (d) comprises one or more compounds selected from the group consisting of aluminum oxy compounds represented by the following formula (3) or (4):

[Formula 16]

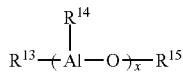

(3)

[Formula 17]

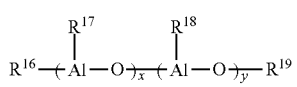

(4)

wherein $R^{13}$ to $R^{19}$ may be the same or different, and represent a hydrogen atom or an alkyl group having 1 to 8 carbon atoms; and x and y represent an integer of 1 to 10000, and/or borane compounds and borate compounds.

Here, examples of the alkyl group having 1 to 8 carbon atoms include those as described above. x and y represent an integer of 1 to 10000, preferably 1 to 100, and more preferably 1 to 20.

Specific examples of the aluminum oxy compound include methylaluminoxane, ethylaluminoxane, n-propylaluminoxane, n-butylaluminoxane, isobutylaluminoxane, t-butylaluminoxane, hexylaluminoxane, isohexylaluminoxane, and copolymers of methylaluminoxane and isobutylaluminoxane. Among these, methylaluminoxane, isobutylaluminoxane, and copolymers of methylaluminoxane and isobutylaluminoxane are preferable because of high solubility in a solvent and ease of handling. The aluminum oxy compound may contain an alkylaluminum compound derived from a raw material such as trimethylaluminum. The aluminum oxy compound may be produced by any known method. For example, the aluminum oxy compound can be produced as follows: trialkylaluminum or dialkylaluminum monochloride is added in an organic solvent such as benzene, toluene, and xylene, and water, steam, steam-containing nitrogen gas, or a salt containing crystallization water such as copper sulfate pentahydrate or aluminum sulfate hexadecahydrate is further added to react these materials. These aluminum oxy compounds may be used singly or in combinations of two or more.

Specific examples of the borane compounds include triphenylborane and tris(pentafluorophenyl)borane and specific examples of the borate compounds include N,N-dimethylanilinium tetrakis(pentafluorophenyl)borate, trityl tetrakis(pentafluorophenyl)borate, lithium tetrakis(pentafluorophenyl)borate, and ammonium tetrakis(pentafluorophenyl)borate. Among these, tris(pentafluorophenyl)borane, N,N-dimethylanilinium tetrakis(pentafluorophenyl)borate, and trityl tetrakis(pentafluorophenyl)borate are preferable because of high solubility in a solvent and ease of handling. These borane compounds and borate compounds may be used singly or in combinations of two or more.

The molar ratio of the lanthanoid-aluminum crosslinked complex to the alkylaluminum compound is preferably lanthanoid-aluminum crosslinked complex:alkylaluminum compound=1:0.1 to 1:50, more preferably lanthanoid-aluminum crosslinked complex:alkylaluminum compound=1: 0.5 to 1:10, and still more preferably lanthanoid-aluminum crosslinked complex:alkylaluminum compound=1:1 to 1:8. At a ratio of the lanthanoid-aluminum crosslinked complex to the alkylaluminum compound within the above range, the molecular weight and activity are well-balanced.

The molar ratio of the lanthanoid-aluminum crosslinked complex to the aluminum oxy compound is preferably lanthanoid-aluminum crosslinked complex:aluminum oxy compound=1:5 to 1:5000, more preferably lanthanoid-aluminum crosslinked complex:aluminum oxy compound=1:5 to 1:1000, and still more preferably lanthanoid-aluminum crosslinked complex:aluminum oxy compound=1:5 to 1:500. At a ratio of the lanthanoid-aluminum crosslinked complex to the aluminum oxy compound within the above range, polymerization reproductivity is improved.

The ratio of the lanthanoid-aluminum crosslinked complex to the borane compound and/or the borate compound is preferably lanthanoid metal:borane element=1:0.5 to 1:5, more preferably lanthanoid metal:borane element=1:0.7 to 1:3, and still more preferably lanthanoid metal:borane element=1:0.9 to 1:2 in terms of the molar ratio of the lanthanoid metal to the borane element. At a ratio of the lanthanoid-aluminum crosslinked complex to the borane compound and/or the borate compound within the above range, polymerization reproductivity is improved.

The ratio of the lanthanoid-aluminum crosslinked complex to the metal halide compound and/or the halosilyl compound is preferably lanthanoid metal:halogen=1:0 to 1:5, more preferably lanthanoid metal:halogen=1:0.5 to 1:4, and still more preferably lanthanoid metal:halogen=1:0.8 to 1:3.5 in terms of the molar ratio of the lanthanoid metal to the halogen element. At a ratio of the lanthanoid-aluminum crosslinked complex to the metal halide compound and/or the halosilyl compound within the above range, polymerization reproductivity is improved.

The polymerization catalyst composition according to present embodiment 1 can be prepared by mixing the lanthanoid-aluminum crosslinked complex with the alkylaluminum compound and optionally with one or more compounds selected from the group consisting of the aluminum oxy compounds and/or the borane compounds and the borate compounds and one or more compounds selected from the group consisting of the metal halide compounds and the halosilyl compounds. At this time, these catalyst components can also be preparatively dissolved in a solvent or the like and diluted for use. The solvent used to dissolve and dilute the catalyst components is preferably a solvent system not reactive with the catalyst composition above to generate any undesirable compound in the polymerization reaction. Specifically, examples of such a solvent include hydrocarbon compounds such as pentane, n-hexane, heptane, octane, cyclopentane, and cyclohexane; and aromatic hydrocarbon compounds such as benzene, toluene, xylene, cumene, and ethylbenzene.

The catalyst components above may be used singly or in combinations of two or more. To efficiently prepare the catalyst composition with high reproductivity, the process is preferably performed under a nitrogen or argon stream. Commercially available argon contained in a gas cylinder may be used at it is. Nitrogen is preferably used after oxygen and the moisture content are removed with a column or the like, or ultra high purity nitrogen is used. Desirably, the tools to be used are preparatively dried sufficiently with a dryer or the like. Preferably, the moisture content, polar substances having active hydrogen and carbonyl groups, and the like are preparatively removed from the solvent and the monomer to be used by use of a dehydrating agent or distillation and purification.

In preparation of the catalyst polymerization composition, the components can be mixed by any method, and examples thereof include (1) a method of mixing only the catalyst components preparatively, (2) a method of mixing the catalyst components in the presence of a small amount of a monomer to be polymerized, (3) a method of mixing the catalyst components in the presence of a coordinating solvent or compound other than the monomer, (4) a method of mixing the catalyst components in the presence of a small amount of the monomer to be polymerized and a coordinating solvent or compound other than the monomer, and (5) a method of preparatively introducing the catalyst components into a reactor containing the monomer to prepare the catalyst polymerization composition in the reactor. Any of these methods may be used for the catalyst system according to the present invention. The respective methods will be described in detail below, but present embodiments will not be limited to the following methods.

(1) Method of Mixing Only Catalyst Components Preparatively

By this method, the catalyst components can be mixed in the presence of a solvent. The lanthanoid-aluminum crosslinked complex can be used in the form of a solid substance. Preferably, the complex is preparatively dissolved in a solvent. The catalyst components can be prepared in order in Method (A) or (B). The one or more compounds selected from the aluminum oxy compounds, the borane compounds, and the borate compounds and the one or more compounds selected from the metal halide compounds and the halosilyl compounds may be optionally added.

(A) Method of mixing the lanthanoid-aluminum crosslinked complex with one or more compounds selected from the aluminum oxy compounds, the borane compounds, and the borate compounds, adding the alkylaluminum compound, and finally adding one or more compounds selected from the metal halide compounds and the halosilyl compounds; or (B) Method of mixing the lanthanoid-aluminum crosslinked complex with the alkylaluminum compound, adding one or more compounds selected from the aluminum oxy compounds, the borane compounds, and the borate compounds, and finally adding one or more compounds selected from the metal halide compounds and the halosilyl compounds.

In this case, the preparation time may be set to any time needed to mix and react the respective catalyst components. The preparation time can be arbitrarily varied between 0.5 and approximately 120 minutes, for example. At a preparation time less than 0.5 minutes, the catalysts components may not be sufficiently mixed. The preparation time of 120 minutes or more does not have any particular problem, but the preparation time more than needed is unnecessary. Approximately 120 minutes at most is enough for the reaction. The temperature during preparation can be within the range of approximately −10 to 60° C. The polymerization catalyst composition after the reaction can be preserved as it is for a long time under a condition in which the temperature, the moisture content, oxygen, and the like are appropriately controlled.

(2) Method of Mixing Catalyst Components in the Presence of Small Amount of Monomer to be Polymerized In this method, the catalyst components are mixed in the presence of a solvent and a monomer used in polymerization. The molar ratio of the lanthanoid-aluminum crosslinked complex to the monomer is preferably approximately 1:1 to 1:2000. The catalyst components can be mixed in order in Method (A) or (B):

(A) Method of preparatively mixing predetermined amounts of the monomer and the solvent, mixing the mixture with the lanthanoid-aluminum crosslinked complex and one or more compounds selected from the aluminum oxy compounds, the borane compounds, and the borate compounds, and finally adding one or more compounds selected from the metal halide compounds and the halosilyl compounds; or (B) Method of preparatively mixing predetermined amounts of the monomer and the solvent, adding the lanthanoid-aluminum crosslinked complex and the alkylaluminum compound to the mixture, then adding one or more compounds selected from the aluminum oxy compounds, the borane compounds, and the borate compounds, and finally adding one or more compounds selected from the metal halide compounds and the halosilyl compounds.

In this case, the preparation time can be set to any time needed to mix and react the catalyst components and to react the catalyst composition with the monomer. The preparation time can be arbitrarily varied between 0.5 and approximately 120 minutes, for example. At a preparation time less than 0.5 minutes, the catalysts components may not be sufficiently mixed. The preparation time of 120 minutes or more does not have any particular problem, but the preparation time more than needed is unnecessary. Approximately 120 minutes at most is enough for the reaction. The temperature during preparation can be within the range of approximately −10 to 60° C. The polymerization catalyst composition after the reaction can be preserved as it is for a long time under a condition in which the temperature, the moisture content, oxygen, and the like are appropriately controlled.

(3) Method of Mixing Catalyst Components in the Presence of Coordinating Solvent or Compound Other than Monomer In this method, the catalyst components are mixed in the presence of a solvent and a coordinating solvent or compound other than the monomer. The molar ratio of the lanthanoid-aluminum crosslinked complex to the monomer is preferably approximately 1:1 to 1:2000. In this case, examples of the coordinating solvent other than the monomer include compounds having an aromatic ring, compounds having a lone electron-pair, and aprotic solvents such as benzene, toluene, xylene, ethylbenzene, mesitylene, cumene, butylbenzenes, diethyl ether, tetrahydrofuran, and pyridine. Examples of the coordinating compound other than the monomer include compounds having a lone electron-pair and compounds having a carbon-carbon double bond such as tertiary amines, alkylphosphines, arylphosphines, phosphates, cyclic olefins, substituted dienes, and cyclic dienes. The catalyst components can be mixed in order in Method (A) or (B):

(A) Method of preparatively mixing a predetermined amount of the coordinating solvent or compound with a solvent, mixing the mixture with the lanthanoid-aluminum crosslinked complex and one or more compounds selected from the aluminum oxy compounds, the borane compounds, and the borate compounds, then adding the alkylaluminum compound, and finally adding one or more compounds selected from the metal halide compounds and the halosilyl compounds; or (B) Method of preparatively mixing a predetermined amount of the coordinating solvent or compound with a solvent, adding the lanthanoid-aluminum crosslinked complex and the alkylaluminum compound to the mixture, then adding one or more compounds selected from the aluminum oxy compounds, the borane compounds, and the borate compounds, and finally adding one or more compounds selected from the metal halide compounds and the halosilyl compounds.

In this case, the preparation time may be set to any time needed to mix and react the respective catalyst components. The preparation time can be arbitrarily varied between 0.5 and approximately 120 minutes, for example. At a preparation time less than 0.5 minutes, the catalysts components may not be sufficiently mixed. The preparation time of 120 minutes does not have any particular problem, but the preparation time more than needed is unnecessary. Approximately 120 minutes at most is enough for the reaction. The temperature during preparation can be within the range of approximately −10 to 60° C. The polymerization catalyst composition after the reaction can be preserved as it is for a long time under a condition in which the temperature, the moisture content, oxygen, and the like are appropriately controlled.

(4) Method of Mixing the Catalyst Components in the Presence of Small Amount of Monomer to be Polymerized and Coordinating Solvent or Compound Other than Monomer In this method, the catalyst components are mixed in the presence of the solvent, the coordinating solvent or compound other than the monomer and the monomer used in polymerization. The molar ratio of the lanthanoid-aluminum crosslinked complex to the monomer is preferably approximately 1:1 to 1:2000. In this case, examples of the coordinating solvent other than the monomer include compounds having an aromatic ring, compounds having a lone electron-pair, and aprotic solvents such as benzene, toluene, xylene, ethylbenzene, mesitylene, cumene, butylbenzenes, diethyl ether, tetrahydrofuran, and pyridine. Examples of the coordinating compound other than the monomer include compounds having a lone electron-pair and compounds having a carbon-carbon double bond such as tertiary amines, alkylphosphines, arylphosphines, phosphates, cyclic olefins, substituted dienes, and cyclic dienes. The catalyst components can be mixed in order in Method (A) or (B):

(A) Method of preparatively mixing a predetermined amount of the coordinating solvent or compound with a predetermined amount of the solvent and a predetermined amount of the monomer, mixing the mixture with the lanthanoid-aluminum crosslinked complex and one or more compounds selected from the aluminum oxy compounds, the borane compounds, and the borate compounds, then adding the alkylaluminum compound, and finally adding one or more compounds selected from the metal halide compounds and the halosilyl compounds; or (B) Method of preparatively mixing a predetermined amount of coordinating solvent or compound with a predetermined amount of the solvent and a predetermined amount of the monomer, adding the lanthanoid-aluminum crosslinked complex and the alkylaluminum compound to the mixture, then mixing the mixture with one or more compounds selected from the aluminum oxy compounds, the borane compounds, and the borate compounds, and finally adding one or more compounds selected from the metal halide compounds and the halosilyl compounds.

In this case, the preparation time can be set to any time needed to mix and react the catalyst components and to react the resultant catalyst component with the monomer. The preparation time can be arbitrarily varied between 0.5 and approximately 120 minutes, for example. At a preparation time less than 0.5 minutes, the catalysts components may not be sufficiently mixed. The preparation time of 120 minutes does not have any particular problem, but the preparation time more than needed is unnecessary. Approximately 120 minutes at most is enough for the reaction. The temperature during preparation can be within the range of approximately −10 to 60° C. The polymerization catalyst composition after the reaction can be preserved as it is for a long time under a condition in which the temperature, the moisture content, oxygen, and the like are appropriately controlled.

(5) Method of Preparatively Introducing Catalyst Components into Reactor Containing Monomer to Prepare Catalyst Polymerization Composition in Reactor In this method, predetermined amounts of a solvent and a monomer are preparatively placed in a reactor, and the catalyst components preparatively dissolved in a solvent is added to the mixture. Desirably the same solvent used in polymerization is used to dissolve the catalyst components. The coordinating solvent used in (3) and (4) above may be used. Similarly in (3) and (4), a coordinating compound may be added. An exemplary method of introducing the catalyst components into the reactor when using a low boiling point monomer such as butadiene is a method of placing the catalyst components in a pressure-resistant container under an inert gas such as nitrogen and argon, and sending the catalyst components with the inert gas into the reactor under pressure. When the monomer has a high boiling point and is polymerized at normal pressure, the catalyst components can be introduced into the reactor with a syringe or the like. The catalyst components may be introduced into the reactor in any order described in the following methods:

(A) Method of introducing the lanthanoid-aluminum crosslinked complex into the reactor first, mixing one or more compounds selected from the aluminum oxy compounds, the borane compounds, and the borate compounds, then adding the alkylaluminum compound, and finally adding one or more compounds selected from the metal halide compounds and the halosilyl compounds; and (B) Method of introducing one or more compounds selected from the aluminum oxy compounds, the borane compounds, and the borate compounds into the reactor first, adding the lanthanoid-aluminum crosslinked complex and the alkylaluminum compound, and finally adding one or more compounds selected from the metal halide compounds and the halosilyl compounds.

At this time, the interval from addition of one catalyst component to addition of another catalyst component may correspond to the time to mix the one catalyst component with the monomer solution in the reactor and react the catalyst component. The interval from addition of the lanthanoid-aluminum crosslinked complex to addition of the aluminum oxy compound, the borane compound, and/or the borate compound can be arbitrarily varied between 0.5 minutes and approximately 60 minutes. At a mixing interval less than 0.5 minutes, mixing may be insufficient. At a mixing interval more than 60 minutes, no problem occurs. However, an interval longer than needed leads to inefficiency. The interval from mixing the lanthanoid-aluminum crosslinked complex with the aluminum oxy compound, the borane compound, and/or the borate compound to addition of the metal halide compound and/or the halosilyl compound can be arbitrarily varied between 1 and approximately 30 minutes. At a mixing interval less than 1 minute, the lanthanoid-aluminum crosslinked complex may not be sufficiently reacted with the aluminum oxy compound, the borane compound, and/or the borate compound. At a mixing interval more than 30 minutes, no problem occurs. However, an interval longer than needed leads to inefficiency.

The conjugated diene monomer using the polymerization catalyst composition according to present embodiment 1 can be polymerized under any condition, in the presence of or the absence of a solvent. In polymerization in the presence of the solvent, preferable solvent systems are those not reactive with the polymerization catalyst composition to generate any undesirable compound in the polymerization reaction. Specific examples thereof include hydrocarbon compounds such as butane, pentane, n-hexane, heptane, octane, cyclopentane, cyclohexane, 1-butene, 2-butene, and 1,2-butadiene; and aromatic hydrocarbon compounds such as benzene, toluene, xylene, cumene, and ethylbenzene. These solvents may be used singly or in combinations of two or more.

The polymerization catalyst composition according to present embodiment 1 reacts with the moisture content or a polar substance. To prevent this, the moisture content, the polar substance, the stabilizer, and the like are preferably preparatively removed from the solvent and the monomer used in the polymerization by use of a dehydrating agent or distillation. The moisture content and the polar substance can be removed by the following methods, for example:

(A) Method of passing the solvent and the monomer through a column containing a dehydrating agent such as alumina and molecular sieves to remove the moisture content. Desirably the column is preparatively dried, and the moisture content is removed from the dehydrating agent in vacuum under high temperature to activate the dehydrating agent. The solvent to be dehydrated is preferably a commercially available dehydrated solvent.

(B) Method of distilling and purification the solvent and the monomer in the presence of a dehydrating agent. For example, a method of refluxing in the presence of hydrogenation calcium, sodium, sodium benzophenone ketyl, or the like, and distillation.

(C) Method of preparatively adding a compound such as alkylaluminum, alkyllithium, and alkylmagnesium to the solvent to be used, and reacting the solution with the moisture content, a polar substance, and the like to remove the moisture content. This method is the simplest if the reaction product of the added compound with the moisture content, the polar substance, and the like does not affect polymerization. A particularly preferable additive is alkylaluminum. This method may be used in combination with Methods (A) and (B).

The polymerization reaction may be performed at any polymerization temperature. The polymerization temperature is preferably −50 to 100° C., more preferably −10 to 80° C., and still more preferably 0 to 70° C. Any polymerization time may be set, and the polymerization time is preferably approximately 1 minute to 6 hours, and more preferably approximately 5 minutes to 5 hours.

These reaction conditions may be properly selected according to types of catalysts. The polymerization reaction in present embodiment 1 may use a batch polymerization method or a continuous polymerization method. Examples of a reactor used in polymerization include vessel reactors and tube reactors. Alternatively, a plurality of reactors may be used in combination. To keep the inside of the reactor uniform during polymerization, the inside of the reactor may be stirred by any method. A known stirring method can be used. To keep the inside of the reactor uniform during stirring, a baffle or the like may be mounted. To keep the reactor temperature at a desired temperature during polymerization, the reactor may be heated or cooled. For the heating method, the reactor can be heated with a jacket, an internal coil, an external heat exchanger, or the like by use of electricity, steam, or a heat medium according to the purpose. In cooling, a jacket, an internal coil, an external heat exchanger, a refluxing apparatus and the like can also be used. In cooling, the reactor can be cooled with water, a coolant, a sensible heat or latent heat of a solvent, or the like. These cooling methods may be used in combination.

After the polymerization reaction reaches a predetermined polymerization rate, a known polymerization terminator is added to the polymerization reaction system to terminate the reaction. Then, the polymer generated by a typical method can be separated from the polymerization reaction system. Examples of the polymerization terminator include compounds having active hydrogen such as water, alcohols, phenols, and carboxylic acids; compounds having a carbonyl group such as ketone, aldehyde, carboxylic acids, esters, and carbamates; compounds having primary and secondary amino groups; compounds having an epoxy group and a glycidyl group; and compounds having a cyano group.

During the polymerization reaction, a functional group can be introduced into the polymer by use of a compound suitable for termination of polymerization. Examples of the compound that can introduce a functional group (functional group introducing agent) include compounds having a carbonyl group such as ketones, aldehydes, carboxylic acids, acid anhydrides, and esters; compounds having primary and secondary imide groups; compounds having an epoxy group and a glycidyl group; amino group-containing alkoxysilane compounds; imino group-containing alkoxysilane compounds; and mercapto group-containing alkoxysilane compounds.

Examples of the ketone compound include 2-propanone, 2-butanone, 2-pentanone, 2-hexanone, 2-heptanone, 2-octanone, 3-pentanone, 2,4-pentanedione, 3-hexanone, 2,5-hexanedione, cyclopropanone, cyclobutanone, cyclopentanone, cyclohexanone, acetophenone, and benzophenone.

Examples of the aldehyde compound include formaldehyde, ethanal, propanal, butanal, pentanal, benzaldehyde, and acrylic aldehyde.

Examples of the carboxylic acid compound include acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, polymethacrylic acid ester compounds, or polyacrylic acid compounds.

Examples of acid anhydrides include acetic anhydride, propionic anhydride, isobutyric anhydride, isovaleric anhydride, heptanoic anhydride, benzoic anhydride, cinnamic anhydride, succinic anhydride, methylsuccinic anhydride, maleic anhydride, glutaric anhydride, citraconic anhydride, phthalic anhydride, and styrene-maleic anhydride copolymers.

Examples of ester compounds include ethyl acetate, ethyl stearate, diethyl adipate, diethyl maleate, methyl benzoate, ethyl acrylate, ethyl methacrylate, diethyl phthalate, dimethyl terephthalate, tributyl trimellitate, tetraoctyl pyromellitate, hexaethyl mellitate, phenyl acetate, polymethyl methacrylate, polyethyl acrylate, polyisobutyl acrylate, dimethyl carbonate, diethyl carbonate, dipropyl carbonate, dihexyl carbonate, and diphenyl carbonate.

Examples of glycidyl compounds include N,N-diglycidylaniline, N,N-diglycidyl-o-toluidine, N,N-diglycidyl(-4-glycidyloxy)aniline, N,N-diglycidyl(-2-glycidyloxy)aniline, N,N,N',N'-tetraglycidylaminodiphenylmethane, trisepoxypropylisocyanurate, N-glycidyl-dibutylamine, N-glycidylpyrrolidine, N-glycidylpiperidine, N-glycidylhexamethyleneimine, N-glycidylmorpholine, N,N'-diglycidylpiperazine, N,N'-diglycidylhomopiperazine, N-glycidyl-N'-methylpiperazine, N-glycidyl-N'-benzylpiperazine, and 2-diglycidylaminoethyl-N-methylpyrrolidine.

Examples of the amino group-containing alkoxysilane compounds include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltrimethoxysilane, 3-(N-methylamino)propyltrimethoxysilane, 3-(N-methylamino)propyltriethoxysilaneN-(2-methoxycarbonyl)methyl-N-methyl-3-aminomethyltrimethoxysilane, N-(2-methoxycarbonyl)methyl-N-methyl-3-aminoethyltrimethoxysilane, N-(2-methoxycarbonyl)methyl-N-methyl-3-aminopropyltrimethoxysilane, N-(2-ethoxycarbonyl)methyl-N-methyl-3-aminomethyltriethoxysilane, N-(2-ethoxycarbonyl)methyl-N-methyl-3-aminoethyltriethoxysilane, N-(2-ethoxycarbonyl)methyl-N-methyl-3-aminopropyltriethoxysilane, and N-(2-ethoxycarbonyl)ethyl-N-trimethylsilyl-3-aminopropyltriethoxysilane. Among these, N-(2-ethoxycarbonyl)ethyl-N-trimethylsilyl-3-aminopropyltriethoxysilane is preferable.

Examples of the imino group-containing alkoxysilane compounds include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-pyrrolidinyl)propyl(triethoxy)silane, 3-(1-pyrrolidinyl)propyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, and 3-(1-hexamethyleneimino)propyl(diethoxy)ethylsilane. Examples thereof also include N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, and N-(cyclohexylidene)-3-(triethoxysilyl)-1-propaneamine; and trimethoxysilyl compounds, methyldiethoxysilyl compounds, ethyldiethoxysilyl compounds, methyldimethoxysilyl compounds, and ethyldimethoxysilyl compounds corresponding to these triethoxysilyl compounds. Furthermore, examples thereof include 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, and N-(3-methyldiethoxysilylpropyl)-4,5-dihydroimidazole.

Examples of the mercapto group-containing alkoxysilane compounds include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, and mercaptophenyltriethoxysilane.

These functional group introducing agents may be used singly or in combinations of two or more.

Second Embodiment

The polymerization catalyst composition according to second embodiment (present embodiment 2) is a catalyst composition for polymerizing a conjugated diene monomer comprising components (a), (c), and (d), wherein the component (a) is a lanthanoid-aluminum crosslinked complex having a structure represented by the following formula (1) or (2):

[Formula 18]

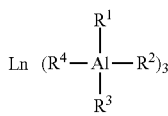
(1)

[Formula 19]

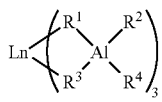
(2)

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group, the component (c) is one or more compounds selected from the group consisting of metal halide compounds and halosilyl compounds, and the component (d) is one or more compounds selected from the group consisting of aluminum oxy compounds represented by the following formula (3) or (4):

[Formula 20]

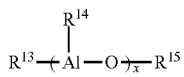
(3)

[Formula 21]

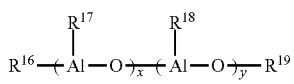
(4)

wherein $R^{13}$ to $R^{19}$ may be the same or different, and represent a hydrogen atom or an alkyl group having 1 to 8 carbon atoms; and x and y represent an integer of 1 to 10000, and/or borane compounds and borate compounds.

The components contained in the polymerization catalyst composition according to present embodiment 2 and the preparation method are the same as those described in present embodiment 1, and the descriptions will be omitted.

By polymerization of a conjugated diene monomer using the polymerization catalyst compositions according to present embodiments 1 and 2, polydiene compounds having a high cis-1,4-bond content can be produced. Here, the cis-1,4-bond content is preferably 96% or more, more preferably 97% or more, and still more preferably 98% or more.

Besides cis-1,4-bond, the molar ratio of the trans-1,4-bond content to the 1,2-vinyl bond content is preferably within the range of 18:1 to 1:1. At a 1,2-vinyl bond content less than the content above, Tg may increase and low temperature properties may reduce. At a 1,2-vinyl bond content more than the content above, a large amount of heat may be generated in application of tires and the like to reduce performance.

The cis-1,4-bond content, the trans-1,4-bond content, and the 1,2-vinyl bond content can be measured by IR, $^1$H-NMR, or $^{13}$C-NMR.

The molecular weight of the polydiene compound contributes to the good balance of exhibition of physical properties during crosslinking and processability. The weight average molecular weight (Mw) of the polydiene compound is preferably within the range of 250000 to 2500000. Molecular weight distribution contributes to the balance of strength and physical properties and an improvement in resistance to wear. The weight average molecular weight (Mw)/number average molecular weight (Mn) is preferably adjusted. The Mw/Mn of the polydiene compound is preferably 1.1 to 5.0. At Mw/Mn within the range above, the polymer will have a good balance between strength and physical properties, and have high resistance to wear.

When the polydiene compound is modified, the rate of introduction of functional groups into the polymer terminal is preferably 40 to 100%.

Here, the rate of introduction of functional groups into the polymer terminal can be calculated by the following methods, for example.

A modified polymer can be separated from a non-modified polymer with silica or an ion exchange resin, and the rate of introduction of functional groups into the modified polydiene compound (hereinafter also referred to as "mass fraction") can be calculated. Specific methods will be described below:

Method 1): a glass column or the like is filled with silica or an ion exchange resin, and a polymer solution prepared by dissolving a polymer containing a predetermined mass of a modified polydiene compound is treated through the glass column. Subsequently, after the polymer solution is dried and solidified under reduced pressure, the mass of the polymer is measured. At this time, the polymer adsorbed by silica or the ion exchange resin is defined as the modified polymer. The mass fraction (C) of the modified polydiene compound can be calculated by the following method:

$$C=[(A-B)/A]\times 100$$

A: the mass of the polymer dissolved in the solvent
B: the mass of the polymer treated with the column
C: % by mass of the modified polymer In this method, during the treatment of the polymer containing the modified polydiene compound with silica or the ion exchange resin, silica or the ion exchange resin may be added to the polymer solution, and silica or the ion exchange resin may be separated by filtration after the solution is stirred for a predetermined period of time. Optionally silica or the ion exchange resin can be rewashed with a solvent or the like.

Method 2): a predetermined amount of silica or an ion exchange resin is added to a polymer solution prepared by dissolving a polymer containing a predetermined mass of a modified polydiene compound. After the solution is stirred for a predetermined period of time, silica or the ion exchange resin is separated by filtration. Then, silica or the ion exchange resin is washed with a solvent. Subsequently, the washing liquid is mixed with the polymer solution, and the mixed solution is dried and solidified under reduced pressure. Then, the mass of the polymer is measured. At this time, the polymer adsorbed by silica or the ion exchange resin is defined as the modified polydiene compound. The mass fraction of the modified polydiene compound can be calculated by the same method as above.

Method 3): a glass column or the like is filled with silica or an ion exchange resin. A polymer solution prepared by dissolving a polymer containing a predetermined mass of a modified polydiene compound and a reference polymer (such as polystyrene) in a solvent is treated through the column. Then, the polymer solution is dried and solidified under reduced pressure. The polymer solution before and after the treatment is measured by NMR. The polymer adsorbed by silica or the ion exchange resin is defined as the modified polydiene compound. The mass fraction of the modified polydiene compound can be calculated by the same method as above.

EXAMPLES

Hereinafter, present embodiments will be described in more detail using Examples, but present embodiments will not be limited to Examples below.

Prior to use, all of the solvents, monomers, nitrogen, and tools used in Examples were preparatively treated by methods shown below such as purification.

Nitrogen: prior to use, nitrogen was passed through a commercially available dehydration column (zeolite) and a deoxidation column (reduced metal).

Solvents: the solvents for preparing the catalyst were refluxed under benzophenone ketyl, and were distilled. Prior to use, the solvents for polymerization other than those shown below were preparatively passed through an activated alumina column, and it was checked that the moisture content reached less than 1 ppm.

Monomers: prior to use, the monomers were refined by the same method as that in the solvents for polymerization.

Tools: prior to use, the tools were dried with a 100° C. dryer for 24 h.

In Examples, physical properties were measured by the following methods.

(1) Polymerization conversion rate: a polymer solution was extracted from a reactor, and was placed into a pressure-resistant bottle containing a mixture of predetermined amounts of n-propylbenzene and toluene. The weight of the extracted polymer solution was measured. The polymer solution was analyzed by gas chromatography using n-propylbenzene as a standard substance to determine the polymerization conversion rate from the ratio between the peak of n-propylbenzene and the peak of butadiene.

(2) Molecular weight: a polymer solution was extracted from a reactor, and was washed with a 1 N hydrochloric acid aqueous solution with a separating funnel three times. The resultant solution was reprecipitated in methanol. A stabilizer was added, and the solution was dried at 50° C. for 3 hours. The molecular weight was determined in terms of polystyrene by GPC with a tetrahydrofuran solution containing an α-methylstyrene dimer as an internal standard.

(3) Microstructure: a polymer solution was refined by the same method as that in the molecular weight sample, and was dried. The resultant polymer was dissolved in deuterochloroform, and was measured by 1H-NMR and 13C-NMR. The ratio between 1,4-bond and 1,2-bond was determined as the ratio between the area at 4.94 to 5.03 ppm (1,2-bond) and the area at 5.30 to 5.50 ppm (1,4-bond), which were determined by 1H-NMR. The ratio between cis-bond and trans-bond in 1,4-bond was determined as the ratio between the area at 25.5 ppm (cis-bond) and the area at 32.8 ppm (trans-bond), which were determined by 13C-NMR.

[Synthesis of Lanthanoid-Aluminum Crosslinked Complex]

The lanthanoid-aluminum crosslinked complex was synthesized according to the method described in Organometallics 1995, 14, 1107-1109. The following raw materials and the like were used. Hereinafter, the chemical formula of the lanthanoid-aluminum crosslinked complex in Examples will be expressed as Ln $[(\mu-R_2)AlR_2]_3$ according to the method described in the above literature.

Nitrogen: prior to use, nitrogen was passed through a commercially available dehydration column (zeolite) (made by NIKKA SEIKO CO., LTD.) and a deoxidation column (reduced metal).

Solvents: tetrahydrofuran, n-hexane

Prior to use, the solvents to be used were preparatively refluxed for 24 hours or more in the presence of benzophenone ketyl, and it was checked with a Karl Fischer moisture meter that the moisture content in each solvent reached less than 1 ppm.

Lanthanoid metal salts:

Neodymium trichloride: commercially available anhydrous chloride (made by Sigma-Aldrich Corporation) was used.

Gadolinium trichloride: commercially available anhydrous chloride (made by Sigma-Aldrich Corporation) was used.

Yttrium trichloride: commercially available anhydrous chloride (made by Sigma-Aldrich Corporation) was used.

Dimethylamidelithium: commercially available dimethylamidelithium (made by Sigma-Aldrich Corporation, 5% hexane dispersion liquid) was filtered under nitrogen. The product was dried, and weighed, and a predetermined amount of dimethylamidelithium was used.

Trimethylaluminum: commercially available trimethylaluminum (made by KANTO CHEMICAL CO., INC., 1 M hexane solution) was used.

Synthesis Example 1

Synthesis of $Nd(thf)_3Cl_3$ $Nd(thf)_3Cl_3$ was synthesized inside of a nitrogen box. 4 g of neodymium trichloride, anhydrous made by Sigma-Aldrich Corporation was placed in a 200 mL Schlenk flask, and 25 mL of tetrahydrofuran was added. The solution was stirred at room temperature overnight to prepare a tetrahydrofuran dispersion liquid of 7.45 g of a target product $Nd(thf)_3Cl_3$.

Synthesis of $Nd(NMe_2)_3.LiCl_3$ $Nd(NMe_2)_3.LiCl_3$ was synthesized inside of a nitrogen box. 2.6 g of dimethylamidelithium was dissolved in 50 mL of tetrahydrofuran. Inside of the nitrogen box, the tetrahydrofuran solution of dimethylamidelithium was slowly dropped into the tetrahydrofuran dispersion liquid of $Nd(thf)_3Cl_3$ over 2 hours while the temperature of the reaction solution was carefully controlled not to rise to room temperature or more. After the reaction, the solution was stirred at room temperature overnight, and tetrahydrofuran as the solvent was distilled away under reduced pressure to prepare 6 g of a target product.

Synthesis of $Nd[(\mu-Me_2)AlMe_2]_3$ $Nd[(\mu-Me_2)AlMe_2]_3$ was synthesized inside of a nitrogen box. 23 mL of n-hexane was added to $Nd(NMe_2)_3.LiCl_3$ to prepare a dispersion liquid. 125 mL of a 1 M hexane solution of trimethylaluminum was slowly dropped over 2 hours while the temperature of the reaction solution was carefully controlled not to rise to room temperature or more. After the reaction, the reaction solution was stirred at room temperature overnight, and n-hexane as the solvent, non-reacted trimethylaluminum and other byproducts were distilled away under reduced pressure until a reaction product was dried and solidified.

The reaction product was dispersed with 15 to 30 mL of n-hexane. The dispersion liquid was filtered with a glass filter to separate an insoluble content. Under reduced pressure, n-hexane was removed from the liquid after filtration to prepare 7.5 g of a crude product by drying and solidification. 2 to 5 mL of n-hexane was added to the crude product to wash the crude product at −50 to 60° C. Then, n-hexane was removed. This operation was repeated four times. In the 5th operation, the product was recrystallized at −50 to 60° C. After n-hexane was removed, the product was dried under reduced pressure to prepare 3.8 g of needle crystals.

The 1H-NMR analysis revealed that the methyl group resided at the same position described in the literature, i.e., at 10.56 ppm, and that a target product having a purity of 97% was synthesized.

Synthesis Example 2

Synthesis of $Gd(thf)_3Cl_3$ $Gd(thf)_3Cl_3$ was synthesized inside of a nitrogen box. 4 g of gadolinium trichloride, anhydrous made by Sigma-Aldrich Corporation was placed in a 200 mL Schlenk flask, and 25 mL of tetrahydrofuran was added. The solution was stirred at room temperature overnight to prepare a tetrahydrofuran dispersion liquid of 7.45 g of a target product $Gd(thf)_3Cl_3$.

Synthesis of $Gd(NMe_2)_3.LiCl_3$ $Gd(NMe_2)_3.LiCl_3$ was synthesized inside of a nitrogen box. 2.6 g of dimethylamidelithium was dissolved in 50 mL of tetrahydrofuran. Inside of the nitrogen box, the tetrahydrofuran solution of dimethylamidelithium was slowly dropped into the tetrahydrofuran dispersion liquid of $Gd(thf)_3Cl_3$ over 2 hours while the temperature of the reaction solution was carefully controlled not to rise to room temperature or more. After the reaction, the solution was stirred at room temperature overnight, and tetrahydrofuran as the solvent was distilled away under reduced pressure to prepare 6 g of a target product.

Synthesis of $Gd[(\mu-Me_2)AlMe_2]_3$ $Gd[(\mu-Me_2)AlMe_2]_3$ was synthesized inside of a nitrogen box. 23 mL of n-hexane was added to $Gd(NMe_2)_3.LiCl_3$ to prepare a dispersion liquid. 125 mL of a 1 M hexane solution of trimethylaluminum was slowly dropped over 2 hours while the temperature of the reaction solution was carefully controlled not to rise to room temperature or more. After the reaction, the reaction solution was stirred at room temperature overnight, and n-hexane as the solvent, non-reacted trimethylaluminum and other byproducts were distilled away under reduced pressure until a reaction product was dried and solidified.

The reaction product was dispersed with 15 to 30 mL of n-hexane. The dispersion liquid was filtered with a glass filter to separate an insoluble content. Under reduced pressure, n-hexane was removed from the liquid after filtration to prepare 7.5 g of a crude product by drying and solidification. 2 to 5 mL of n-hexane was added to the crude product to wash the crude product at −50 to 60° C. Then, n-hexane was removed. This operation was repeated four times. In the 5th operation, the product was recrystallized at −50 to 60° C. After n-hexane was removed, the product was dried under reduced pressure to prepare 3.8 g of a target product.

Synthesis Example 3

Synthesis of $Y(thf)_3Cl_3$ $Y(thf)_3Cl_3$ was synthesized inside of a nitrogen box. 4 g of yttrium trichloride, anhydrous made by Sigma-Aldrich Corporation was placed in a 200 mL Schlenk flask, and 25 mL of tetrahydrofuran was added. The solution was stirred at room temperature overnight to prepare a tetrahydrofuran dispersion liquid of 7.45 g of a target product $Nd(thf)_3Cl_3$.

Synthesis of $Y(NMe_2)_3.LiCl_3$ $Y(NMe_2)_3.LiCl_3$ was synthesized inside of a nitrogen box. 2.6 g of dimethylamidelithium was dissolved in 50 mL of tetrahydrofuran. Inside of the nitrogen box, the tetrahydrofuran solution of dimethylamidelithium was slowly dropped into the tetrahydrofuran dispersion liquid of $Nd(thf)_3Cl_3$ over 2 hours while the temperature of the reaction solution was carefully controlled not to rise to room temperature or more. After the reaction, the solution was stirred at room temperature overnight, and tetrahydrofuran as the solvent was distilled away under reduced pressure to prepare 6 g of a target product.

Synthesis of $Y[(\mu-Me_2)AlMe_2]_3$ $Y[(\mu-Me_2)AlMe_2]_3$ was synthesized inside of a nitrogen box. 23 mL of n-hexane was added to $Y(NMe_2)_3.LiCl_3$ to prepare a dispersion liquid. 125 mL of a 1 M hexane solution of trimethylaluminum was slowly dropped over 2 hours while the temperature of the reaction solution was carefully controlled not to rise to room temperature or more. After the reaction, the reaction solution was stirred at room temperature overnight, and n-hexane as the solvent, non-reacted trimethylaluminum and other byproducts were was distilled away under reduced pressure until a reaction product was dried and solidified.

The reaction product was dispersed with 15 to 30 mL of n-hexane. The dispersion liquid was filtered with a glass filter to separate an insoluble content. Under reduced pressure, n-hexane was removed from the liquid after filtration to prepare 7.5 g of a crude product by drying and solidification. 2 to 5 mL of n-hexane was added to the crude product to wash the crude product at −50 to 60° C. Then, n-hexane was removed. This operation was repeated four times. In the 5th operation, the product was recrystallized at −50 to 60° C. After n-hexane was removed, the product was dried under reduced pressure to prepare 3.8 g of a target product.

Comparative Synthesis Example 1

Synthesis of $Nd(Vers)_3$ $Nd(Vers)_3$ was synthesized in an aqueous system. A raw material, cyclohexane, was used without being treated by purification or the like. 2.9 g of versatic acid ($C_9H_{19}COOH$, Mw=172.3) was dissolved in 300 mL of cyclohexane (Wako Pure Chemical Industries, Ltd., super grade) in a 1000 mL beaker. 0.6 g of sodium hydroxide was dissolved in 200 mL of water, and the solution was added to the solution of versatic acid in cyclohexane. The solution was stirred for 2 hours. A white solid was deposited, and was dissolved in a water layer. The color of the water layer changed to white. Then, 2 g of $NdCl_3 \cdot 6H_2O$ was dissolved in 50 mL of water, and the solution was added into the beaker. The solution was stirred for 2 hours.

When the water layer became transparent and an organic layer became violet, the solution in the beaker was placed into a 1000 mL separating funnel. After the water layer was separated, the organic layer was further washed with 100 mL of water twice. (300 mL of Cyclohexane was added to the solution. The solution was placed in a 1000 mL recovery flask. A Dean-Stark trap and a Dimroth condenser were attached to the recovery flask. While stirring in an oil bath was being performed, refluxing was started. While water deposited in the Dean-Stark trap was being removed, refluxing was performed until the liquid in the flask became transparent and the moisture content reached less than 100 ppm. The solution in the flask was condensed to 100 mL, and was placed into a pressure-resistant bottle or a Schlenk flask. Then, the inside of the system was subjected to degassing and replacement with nitrogen. Nd was titrated by a Cu-PAN method to determine the concentration as 0.17 mol/L.

Comparative Synthesis Example 2

Under a nitrogen atmosphere, an n-hexane solution (2.8 mL, 6.2 mmol) of 15% n-butyllithium was slowly dropped into a solution of pentamethylcyclopentadiene (made by Sigma-Aldrich Corporation) (0.8 g, 6.2 mmol) in 20 mL of dehydrated n-hexane. The produced precipitate was filtered to prepare 0.88 g of a white precipitate. The white precipitate was dissolved in dehydrated tetrahydrofuran, and the solution was slowly dropped into a dehydrated tetrahydrofuran solution of gadolinium chloride, anhydrous (made by Sigma-Aldrich Corporation) (0.79 g, 3 mmol). Tetrahydrofuran was distilled away from the reaction solution, and 40 mL of dehydrated toluene was added to prepare a toluene solution of $[(C_5Me_5)_2GdCl_2Li (thf)_2]$ (1.95 g, 3 mmol). 15 mL of a toluene solution of $K[N(SiMe_3)_2]$ (0.60 g, 3 mmol) (made by Sigma-Aldrich Corporation) was slowly dropped into 40 mL of the resultant toluene solution of $[(C_5Me_5)_2GdCl_2Li(thf)_2]$. The resultant solution was stirred at room temperature for 16 hours.

After stirring, toluene was distilled away from the solution under reduced pressure. 60 mL of hexane was added to the resultant residue, and the solution was stirred for 3 hours. The solution was filtered through a filter to remove precipitates. Hexane was distilled away from the resultant filtrate under reduced pressure to prepare a yellow solid, i.e., $[(C_5Me_5)_2GdN(SiMe_3)_2]$ (1.10 g, yield: 62%).

Comparative Synthesis Example 3

A yellow green solid, i.e., $[(C_5Me_4H)_2GdN(SiMe_3)_2]$ was prepared (yield: 65%) in the same manner as in Comparative Synthesis Example 2 except that $[(C_5Me_5)_2GdCl_2Li(thf)_2]$ was replaced with $[(C_5Me_4H)_2GdCl_2Li(thf)_2]$.

Comparative Synthesis Example 4

Under a nitrogen atmosphere, 1.59 mL of a tetrahydrofuran solution of $Na(C_5H_5)$ (3.17 mmol) was slowly dropped into 10 mL of a tetrahydrofuran solution of $GdCl_3$ (0.84 g, 3.17 mmol), and the resultant solution was stirred at room temperature for 1 hour. 15 mL of a tetrahydrofuran solution of $KN(SiMe_3)_2$ (1.26 g, 6.34 mmol) was added to the solution after stirring, and the solution was stirred at room temperature for 14 hours.

Tetrahydrofuran was distilled away from the solution under reduced pressure, and 60 mL of hexane was added to the resultant residue. The resultant solution was filtered through a filter to remove precipitates. Hexane was distilled away from the filtrate under reduced pressure to prepare a white solid, i.e., $[(C_5H_5)Gd[N(SiMe_3)_2]_2](thf)$ (1.14 g, yield: 52%).

Comparative Synthesis Example 5

A blue solid, i.e., $[(C_5H_5)Nd[N(SiMe_3)_2]_2](thf)$ was prepared (yield: 45%) in the same manner as in Comparative Synthesis Example 5 except that the raw material $GdCl_3$ was replaced with $NdCl_3$.

Comparative Synthesis Example 6

Synthesis of $(i\text{-}PrC_5H_4)_2GdN(SiMe_3)_2$

Nitrogen: prior to use, nitrogen was passed through a commercially available dehydration column (zeolite) and deoxidation column (reduced metal).

Solvents: tetrahydrofuran, n-hexane, toluene

Prior to use, the solvents to be used were preparatively refluxed for 24 hours or more in the presence of benzophenone ketyl, and it was checked with a Karl Fischer moisture meter that the moisture content in each solvent reached less than 1 ppm.

1.91 g of a tetrahydrofuran dispersion liquid of $Gd(thf)_3Cl_3$ was prepared by the same method as that for synthesis of $Gd(thf)_3Cl_3$ in Synthesis Example 2. While the dispersion liquid was being stirred in a nitrogen box, 40 mL of a tetrahydrofuran solution of 1.1 g of $i\text{-}PrC_5H_4Na$ (made by Sigma-Aldrich Corporation) was slowly dropped into the dispersion liquid so as to prevent the temperature of the dispersion liquid from rising to room temperature or more. After dropping was completed, the reaction solution was stirred at room temperature for 16 hours or more. Next, tetrahydrofuran was distilled away under reduced pressure, and 30 mL of dehydrated toluene was added. 20 mL of a toluene solution of 0.72 g of $K[N(SiMe_3)_2]$ (made by Sigma-Aldrich Corporation) was slowly dropped into the solution so as to prevent the temperature of the solution from rising to room temperature or more. After dropping, the solution was stirred at room temperature for 16 hours. Subsequently, toluene was distilled away under reduced pressure, and 100 mL of hexane was added. Precipitates were filtered through a filter, and hexane was distilled away under reduced pressure to prepare 21.6 g of a yellow liquid, i.e., $(i\text{-}PrC_5H_4)_2GdN(SiMe_3)$.

[Preparation of Polymerization Catalyst Composition]

The entire operation to prepare a catalyst composition was performed inside of a nitrogen box. The following solvents and tools were used.

Solvents: cyclohexane, n-hexane, and toluene used were commercially available dehydration solvents (dehydrated cyclohexane and n-hexane made by KANTO CHEMICAL CO., INC.; super dehydrated toluene made by Wako Pure Chemical Industries, Ltd.) preparatively prepared by passing each solvent through an activated alumina column to adjust the moisture content to less than 1 ppm.

Tools: tools used (sample vials, syringes, needles, stainless steel pipes) were preparatively dried with a dryer at 100° C. for 24 hours.

The following aluminum oxy compounds, alkylaluminum compounds, borane compounds, and borate compounds were used.

[Aluminum Oxy Compounds]
made by Tosoh Finechem Corporation: TMAO-210
Chemical Formula

[Formula 22]

$$\text{---}(\text{Al}-\text{O})_n\text{---}$$
$$\quad\quad |$$
$$\quad\quad \text{Me}$$

made by Tosoh Finechem Corporation: MMAO-3A
Chemical Formula

[Formula 23]

$$\text{---}(\text{Al}-\text{O})_n(\text{Al}-\text{O})_m\text{---}$$
$$\quad\quad |\quad\quad\quad |$$
$$\quad\quad \text{Me}\quad\quad \text{i-Bu}$$

made by Tosoh Finechem Corporation: PBAO
Chemical Formula

[Formula 24]

$$\text{---}(\text{Al}-\text{O})_n\text{---}$$
$$\quad\quad |$$
$$\quad\quad \text{i-Bu}$$

[Alkylaluminum Compound]
made by KANTO CHEMICAL CO., INC., diisobutylaluminum hydride

[Borane Compound]
made by Sigma-Aldrich Corporation, tris(pentafluorophenyl)borane
Chemical Formula $$B[(C_6F_5)_3]$$

[Borate Compounds]
made by Tosoh Finechem Corporation, trityltetrakis(pentafluorophenyl)borate
Chemical Formula $$(C_6H_5)_3C[B(C_6F_5)_4]$$

made by Tosoh Finechem Corporation, N,N-dimethylanilinium tetrakis(pentafluorophenyl)borate
Chemical Formula $$(CH_3)_2N(C_6H_5)[B(C_6F_5)_4]$$

The following metal halide compounds were used.
made by Tosoh Finechem Corporation, diethylaluminum chloride
Chemical Formula $$(C_2H_5)_2AlCl$$

made by Tosoh Finechem Corporation, dimethylaluminum chloride
Chemical Formula $$(CH_3)_2AlCl$$

made by Tosoh Finechem Corporation, ethylaluminum sesquichloride
Chemical Formula $$(C_2H_5)_3Al_2Cl_3$$

Examples 1 to 15

A predetermined amount (see Table 1) of $Nd[(\mu\text{-}Me_2)AlMe_2]_3$ prepared in Synthesis Example 1 was dissolved in 20 mL of cyclohexane in a sample vial. A predetermined amount (see Table 1) of methylaluminoxane (made by Tosoh Finechem Corporation, TMAO-210, 2.4 M, toluene solution) was added, and the solution was stirred for 15 minutes. Subsequently, 9 mL of diisobutylaluminum hydride (KANTO CHEMICAL CO., INC., 1.0 M, hexane solution) was added, and the solution was stirred for 5 minutes. Subsequently, a predetermined amount (see Table 1) of diethylaluminum chloride (made by Tosoh Finechem Corporation, 1 M, hexane solution) was added. The solution was stirred for 15 minutes, and was placed in an stainless steel pipe to prepare Catalyst Composition 1.

Example 16

A predetermined amount (see Table 2) of $Nd[(\mu\text{-}Me_2)AlMe_2]_3$ prepared in Synthesis Example 1 was dissolved in 20 mL of cyclohexane in a sample vial. A predetermined amount (see Table 2) of methylaluminoxane (made by Tosoh Finechem Corporation, MMAO-3A, 2.4 M, toluene solution) was added, and the solution was stirred for 15 minutes. Subsequently, a predetermined amount of triisobutylaluminum (KANTO CHEMICAL CO., INC., 1.0 M, hexane solution) as alkylaluminum (see Item of alkylaluminum in Table 2) was added, and the solution was stirred for 15 minutes. Subsequently, a predetermined amount (see Table 2) of diethylaluminum chloride (made by Tosoh Finechem Corporation, 1 M, hexane solution) was added. The solution was stirred for 15 minutes, and was placed in an stainless steel pipe to prepare Catalyst Composition 2.

Example 17

A predetermined amount (see Table 2) of $Nd[(\mu\text{-}Me_2)AlMe_2]_3$ prepared in Synthesis Example 1 was dissolved in 20 mL of cyclohexane in a sample vial. A predetermined amount (see Table 2) of methylaluminoxane (made by Tosoh Finechem Corporation, MMAO-3A, 2.4 M, toluene solution) was added, and the solution was stirred for 15 minutes. Subsequently, a predetermined amount of triethylaluminum (KANTO CHEMICAL CO., INC., 1.0 M, hexane solution) as alkylaluminum (see Item of alkylaluminum in Table 2) was added, and the solution was stirred for 20 minutes. Subsequently, a predetermined amount (see Table 2) of diethylaluminum chloride (made by Tosoh Finechem Corporation, 1 M, hexane solution) was added. The solution was stirred for 15 minutes, and was placed in an stainless steel pipe to prepare Catalyst Composition 3.

Example 18

A predetermined amount (see Table 2) of $Nd[(\mu\text{-}Me_2)AlMe_2]_3$ prepared in Synthesis Example 1 was dissolved in 20 mL of cyclohexane in a sample vial. A predetermined amount (see Table 2) of methylaluminoxane (made by Tosoh Finechem Corporation, MMAO-3A, 2.4 M, toluene solution) was added, and the solution was stirred for 15 minutes.

Subsequently, a predetermined amount of trihexylaluminum (made by Tosoh Finechem Corporation, TNHAL, 1.0 M, cyclohexane solution) as alkylaluminum (see Item of alkylaluminum in Table 2) was added, and the solution was stirred for 15 minutes. Subsequently, a predetermined amount (see Table 2) of diethylaluminum chloride (made by Tosoh Finechem Corporation, 1 M, hexane solution) was added. The solution was stirred for 15 minutes, and was placed in an stainless steel pipe to prepare Catalyst Composition 4.

Examples 19 to 21

A predetermined amount (see Table 3) of $Nd[(\mu-Me_2)AlMe_2]_3$ prepared in Synthesis Example 1 was dissolved in 20 mL of cyclohexane in a sample vial. A predetermined amount (see Table 3) of methylaluminoxane (made by Tosoh Finechem Corporation, MMAO-3A, 2.4 M, toluene solution) was added, and the solution was stirred for 15 minutes. Subsequently, a predetermined amount (see Table 3) of diisobutylaluminum aluminum hydride (made by Tosoh Finechem Corporation, TNHAL, 1.0 M, cyclohexane solution) was added, and the solution was stirred for 15 minutes. Subsequently, a predetermined amount (see Table 3) of diethylaluminum chloride (made by Tosoh Finechem Corporation, 1 M, hexane solution) was added. The solution was stirred for 15 minutes, and was placed in an stainless steel pipe to prepare Catalyst Composition 5.

Examples 22 and 23

A predetermined amount (see Table 4) of $Nd[(\mu-Me_2)AlMe_2]_3$ prepared in Synthesis Example 1 was dissolved in 20 mL of cyclohexane in a sample vial. A predetermined amount (see Table 4) of methylaluminoxane (made by Tosoh Finechem Corporation, PBAO, 2.4 M, cyclohexane solution) was added, and the solution was stirred for 15 minutes. Subsequently, a predetermined amount (see Table 4) of diisobutylaluminum hydride (KANTO CHEMICAL CO., INC., 1.0 M, hexane solution) was added, and the solution was stirred for 5 minutes. Subsequently, a predetermined amount (see Table 4) of diethylaluminum chloride (made by Tosoh Finechem Corporation, 1 M, hexane solution) was added. The solution was stirred for 15 minutes, and was placed in an stainless steel pipe to prepare Catalyst Composition 6.

Example 24

40 mg of a predetermined amount (see Table 5) of $Nd[(\mu-Me_2)AlMe_2]_3$ prepared in Synthesis Example 1 was dissolved in 20 mL of cyclohexane in a sample vial. A predetermined amount (see Table 5) of tris(pentafluorophenyl)borane (Chemical Formula) $B[(C_6F_5)_3]$ (made by Sigma-Aldrich Corporation) was added, and the solution was stirred for 15 minutes. Subsequently, a predetermined amount (see Table 5) of diisobutylaluminum hydride (KANTO CHEMICAL CO., INC., 1.0 M, hexane solution) was added, and the solution was stirred for 5 minutes. Subsequently, a predetermined amount (see Table 5) of diethylaluminum chloride (made by Tosoh Finechem Corporation, 1 M, hexane solution) was added. The solution was stirred for 15 minutes, and was placed in an stainless steel pipe to prepare Catalyst Composition 7.

Example 25

A predetermined amount (see Table 5) of $Nd[(\mu-Me_2)AlMe_2]_3$ prepared in Synthesis Example 1 was dissolved in 20 mL of cyclohexane in a sample vial. A predetermined amount (see Table 5) of trityltetrakis(pentafluorophenyl)borate (Chemical Formula) $(C_6H_5)_3C[B(C_6F_5)_4]$ (made by Tosoh Finechem Corporation) was added, and the solution was stirred for 15 minutes. Subsequently, a predetermined amount (see Table 5) of diisobutylaluminum hydride (KANTO CHEMICAL CO., INC., 1.0 M, hexane solution) was added, and the solution was stirred for 5 minutes. Subsequently, a predetermined amount (see Table 5) of diethylaluminum chloride (made by Tosoh Finechem Corporation) was added. The solution was stirred for 15 minutes, and was placed in an stainless steel pipe to prepare Catalyst Composition 8.

Example 26

A predetermined amount (see Table 5) of $Nd[(\mu-Me_2)AlMe_2]_3$ prepared in Synthesis Example 1 was dissolved in 20 mL of toluene in a sample vial. A predetermined amount (see Table 5) of trityltetrakis(pentafluorophenyl)borate (Chemical Formula) $(C_6H_5)_3C[B(C_6F_5)_4]$ (made by Tosoh Finechem Corporation) was added, and the solution was stirred for 15 minutes. Subsequently, a predetermined amount (see Table 5) of diisobutylaluminum hydride (KANTO CHEMICAL CO., INC., 1.0 M, hexane solution) was added, and the solution was stirred for 5 minutes. Subsequently, a predetermined amount (see Table 5) of diethylaluminum chloride (made by Tosoh Finechem Corporation) was added. The solution was stirred for 15 minutes, and was placed in an stainless steel pipe to prepare Catalyst Composition 9.

Example 27

A predetermined amount (see Table 5) of $Nd[(\mu-Me_2)AlMe_2]_3$ prepared in Synthesis Example 1 was dissolved in 20 mL of cyclohexane in a sample vial. A predetermined amount (see Table 5) of N,N-dimethylanilinium tetrakis (pentafluorophenyl)borate (Chemical Formula) $(CH_3)_2N(C_6H_5)[B(C_6F_5)_4]$ (made by Tosoh Finechem Corporation) was added, and the solution was stirred for 15 minutes. Subsequently, a predetermined amount (see Table 5) of diisobutylaluminum hydride (KANTO CHEMICAL CO., INC., 1.0 M, hexane solution) was added, and the solution was stirred for 5 minutes. Subsequently, a predetermined amount (see Table 5) of diethylaluminum chloride (made by Tosoh Finechem Corporation, 1 M, hexane solution) was added. The solution was stirred for 15 minutes, and was placed in an stainless steel pipe to prepare Catalyst Composition 10.

Example 28

A predetermined amount (see Table 6) of $Nd[(\mu-Me_2)AlMe_2]_3$ prepared in Synthesis Example 1 was dissolved in 20 mL of cyclohexane in a sample vial. A predetermined amount (see Table 6) of methylaluminoxane (made by Tosoh Finechem Corporation, TMAO-210, 2.4 M, cyclohexane solution) was added, and the solution was stirred for 15 minutes. Subsequently, a predetermined amount (see Table 6) of diisobutylaluminum hydride (KANTO CHEMICAL CO., INC., 1.0 M, hexane solution) was added, and the solution was stirred for 5 minutes. Subsequently, a predetermined amount (see Table 6) of dimethylaluminum chloride (made by Tosoh Finechem Corporation, 1 M, hexane solution) was added. The solution was stirred for 15 minutes, and was placed in an stainless steel pipe to prepare Catalyst Composition 11.

Example 29

A predetermined amount (see Table 6) of Nd[(μ-Me$_2$)AlMe$_2$]$_3$ prepared in Synthesis Example 1 was dissolved in 20 mL of cyclohexane in a sample vial. A predetermined amount (see Table 6) of methylaluminoxane (made by Tosoh Finechem Corporation, TMAO-210, 2.4 M, cyclohexane solution) was added, and the solution was stirred for 15 minutes. Subsequently, a predetermined amount (see Table 6) of diisobutylaluminum hydride (KANTO CHEMICAL CO., INC., 1.0 M, hexane solution) was added, and the solution was stirred for 5 minutes. Subsequently, a predetermined amount (see Table 6) of ethylaluminum sesquichloride (made by Tosoh Finechem Corporation, 1 M, hexane solution) was added. The solution was stirred for 15 minutes, and was placed in an stainless steel pipe to prepare Catalyst Composition 12.

Example 30

Catalyst Composition 13 was prepared by the same method as in Example 1 except that Nd[(μ-Me$_2$)AlMe$_2$]$_3$ was replaced with a predetermined amount (see Table 7) of Gd[(μ-Me$_2$)AlMe$_2$]$_3$ prepared in Synthesis Example 2.

Example 31

Catalyst Composition 14 was prepared by the same method as in Example 1 except that Nd[(μ-Me$_2$)AlMe$_2$]$_3$ was replaced with a predetermined amount (see Table 7) of Y[(μ-Me$_2$)AlMe$_2$]$_3$ prepared in Synthesis Example 3.

Examples 32 to 40

A predetermined amount (see Table 8) of Nd[(μ-Me$_2$)AlMe$_2$]$_3$ prepared in Synthesis Example 1 was dissolved in 20 mL of cyclohexane in a sample vial. A predetermined amount (see Table 8) of methylaluminoxane (made by Tosoh Finechem Corporation, TMAO-210, 2.4 M, toluene solution) was added, and the solution was stirred for 15 minutes. Subsequently, a predetermined amount (see Table 8) of diethylaluminum chloride (made by Tosoh Finechem Corporation, 1 M, hexane solution) was added. The solution was stirred for 15 minutes, and was placed in an stainless steel pipe to prepare Catalyst Composition 15.

Examples 41 to 43

A predetermined amount (see Table 9) of Nd[(μ-Me$_2$)AlMe$_2$]$_3$ prepared in Synthesis Example 1 was dissolved in 20 mL of cyclohexane in a sample vial. A predetermined amount (see Table 9) of methylaluminoxane (made by Tosoh Finechem Corporation, MMAO-3A, 2.4 M, cyclohexane solution) was added, and the solution was stirred for 15 minutes. Subsequently, a predetermined amount (see Table 9) of diethylaluminum chloride (made by Tosoh Finechem Corporation, 1 M, hexane solution) was added. The solution was stirred for 15 minutes, and was placed in an stainless steel pipe to prepare Catalyst Composition 16.

Examples 44 and 45

A predetermined amount (see Table 10) of Nd[(μ-Me$_2$)AlMe$_2$]$_3$ prepared in Synthesis Example 1 was dissolved in 20 mL of cyclohexane in a sample vial. A predetermined amount (see Table 10) of methylaluminoxane (made by Tosoh Finechem Corporation, PBAO, 2.4 M, cyclohexane solution) was added, and the solution was stirred for 15 minutes. Subsequently, a predetermined amount (see Table 10) of diethylaluminum chloride (made by Tosoh Finechem Corporation, 1 M, hexane solution) was added. The solution was stirred for 15 minutes, and was placed in an stainless steel pipe to prepare Catalyst Composition 17.

Example 46

A predetermined amount (see Table 11), 40 mg of Nd[(μ-Me$_2$)AlMe$_2$]$_3$ prepared in Synthesis Example 1 was dissolved in 20 mL of cyclohexane in a sample vial. A predetermined amount (see Table 11) of tris(pentafluorophenyl)borane (Chemical Formula) B[(C$_6$F$_5$)$_3$] (made by Sigma-Aldrich Corporation) was added, and the solution was stirred for 15 minutes. Subsequently, a predetermined amount (see Table 11) of diethylaluminum chloride (made by Tosoh Finechem Corporation, 1 M, hexane solution) was added. The solution was stirred for 15 minutes, and was placed in an stainless steel pipe to prepare Catalyst Composition 18.

Example 47

A predetermined amount (see Table 11), 40 mg of Nd[(μ-Me$_2$)AlMe$_2$]$_3$ prepared in Synthesis Example 1 was dissolved in 20 mL of cyclohexane in a sample vial. A predetermined amount (see Table 11) of trityltetrakis(pentafluorophenyl)borate (Chemical Formula) (C$_6$H$_5$)$_3$C[B(C$_6$F$_5$)$_4$] (made by Tosoh Finechem Corporation) was added, and the solution was stirred for 15 minutes. Subsequently, a predetermined amount (see Table 11) of diethylaluminum chloride (made by Tosoh Finechem Corporation) was added. The solution was stirred for 15 minutes, and was placed in an stainless steel pipe to prepare Catalyst Composition 19.

Example 48

A predetermined amount (see Table 11) of Nd[(μ-Me$_2$)AlMe$_2$]$_3$ prepared in Synthesis Example 1 was dissolved in 20 mL of toluene in a sample vial. A predetermined amount (see Table 11) of trityltetrakis(pentafluorophenyl)borate (Chemical Formula) (C$_6$H$_5$)$_3$C[B(C$_6$F$_5$)$_4$] (made by Tosoh Finechem Corporation) was added, and the solution was stirred for 15 minutes. Subsequently, a predetermined amount (see Table 11) of diethylaluminum chloride (made by Tosoh Finechem Corporation) was added. The solution was stirred for 15 minutes, and was placed in an stainless steel pipe to prepare Catalyst Composition 20.

Example 49

A predetermined amount (see Table 11) of Nd[(μ-Me$_2$)AlMe$_2$]$_3$ prepared in Synthesis Example 1 was dissolved in 20 mL of cyclohexane in a sample vial. A predetermined amount (see Table 11) of N,N-dimethylanilinium tetrakis(pentafluorophenyl)borate (Chemical Formula) (CH$_3$)$_2$N(C$_6$H$_5$) [B(C$_6$F$_5$)$_4$] (made by Tosoh Finechem Corporation) was added, and the solution was stirred for 15 minutes. Subsequently, a predetermined amount (see Table 11) of diethylaluminum chloride (made by Tosoh Finechem Corporation, M, hexane solution) was added. The solution was stirred for 15 minutes, and was placed in an stainless steel pipe to prepare Catalyst Composition 21.

Example 50

A predetermined amount (see Table 12) of Nd[(μ-Me$_2$)AlMe$_2$]$_3$ prepared in Synthesis Example 1 was dissolved in 20 mL of cyclohexane in a sample vial. A predetermined amount (see Table 12) of methylaluminoxane (made by Tosoh Finechem Corporation, TMAO-210, 2.4 M, cyclohexane solution) was added, and the solution was stirred for 15 minutes. Subsequently, a predetermined amount (see Table 12) of dimethylaluminum chloride (made by Tosoh Finechem Corporation, 1 M, hexane solution) was added. The solution was stirred for 15 minutes, and was placed in an stainless steel pipe to prepare Catalyst Composition 22.

Example 51

A predetermined amount (see Table 12) of Nd[(μ-Me$_2$)AlMe$_2$]$_3$ prepared in Synthesis Example 1 was dissolved in 20 mL of cyclohexane in a sample vial. A predetermined amount (see Table 12) of methylaluminoxane (made by Tosoh Finechem Corporation, TMAO-210, 2.4 M, cyclohexane solution) was added, and the solution was stirred for 15 minutes. Subsequently, a predetermined amount (see Table 12) of ethylaluminum sesquichloride (made by Tosoh Finechem Corporation, 1 M, hexane solution) was added. The solution was stirred for 15 minutes, and was placed in an stainless steel pipe to prepare Catalyst Composition 23.

Example 52

Catalyst Composition 23 was prepared by the same method as in Example 1 except that Nd[(μ-Me$_2$)AlMe$_2$]$_3$ was replaced with a predetermined amount (see Table 13) of Gd[(μ-Me$_2$)AlMe$_2$]$_3$ prepared in Synthesis Example 2.

Example 53

Catalyst Composition 24 was prepared by the same method as in Example 1 except that Nd[(μ-Me$_2$)AlMe$_2$]$_3$ was replaced with a predetermined amount (see Table 13) of Y[(μ-Me$_2$)AlMe$_2$]$_3$ prepared in Synthesis Example 3.

Comparative Example 1

In a pressure-resistant bottle preparatively subjected to replacement with nitrogen, 10 mL of cyclohexane and 1 mL of butadiene were placed. A predetermined amount (see Table 14) of cyclohexane solution of Nd(Vers)$_3$ prepared in Comparative Synthesis Example 1 was added, and was mixed with cyclohexane and butadiene. A predetermined amount (see Table 14) of diisobutylaluminum hydride was added, and the solution was reacted by stirring for 5 minutes. A predetermined amount (see Table 14) of diethylaluminum chloride was added, and the solution was reacted for 20 minutes to prepare Comparative Catalyst Composition 1.

Comparative Example 2

A predetermined amount (see Table 14) of Nd[(μ-Me$_2$)AlMe$_2$]$_3$ prepared in Synthesis Example 1 was dissolved in 20 mL of cyclohexane in a sample vial. Subsequently, a predetermined amount (see Table 14) of diethylaluminum chloride (made by Tosoh Finechem Corporation, 1 M, hexane solution) was added. The solution was stirred for 15 minutes, and was placed in an stainless steel pipe to prepare Comparative Catalyst Composition 2.

Comparative Examples 3 to 5

In a glove box under a nitrogen atmosphere, a predetermined amount (see Table 15) of [(i-PrC$_5$H$_4$)$_2$GdN(SiMe$_3$)$_2$] prepared in Comparative Synthesis Example 6, a predetermined amount (see Table 15) of trityltetrakis(pentafluorophenyl)borate (Chemical Formula) (C$_6$H$_5$)$_3$C[B(C$_6$F$_5$)$_4$] (made by Tosoh Finechem Corporation), and a predetermined amount (see Table 15) of diisobutylaluminum hydride were placed in a pressure-resistant sample tube, and were dissolved with 10 mL of toluene. The solution was placed in an stainless steel pipe to prepare Comparative Catalyst Composition 3.

Comparative Example 6

In a glove box under a nitrogen atmosphere, a predetermined amount (see Table 16) of [(i-PrC$_5$H$_4$)$_2$GdN(SiMe$_3$)$_2$] prepared in Comparative Synthesis Example 6 and a predetermined amount (see Table 16) of MMAO-3A (made by Tosoh Finechem Corporation, toluene solvent) were placed in a pressure-resistant sample tube, and were dissolved with 5 mL of toluene. The solution was placed in an stainless steel pipe to prepare Comparative Catalyst Composition 4.

Comparative Example 7

In a glove box under a nitrogen atmosphere, a predetermined amount (see Table 17) of [(C$_5$Me$_5$)$_2$GdN(SiMe$_3$)$_2$] prepared in Comparative Synthesis Example 2 was placed in a sample vial, and was dissolved with 6 mL of toluene. Next, a predetermined amount (see Table 17) of MMAO-3A (made by Tosoh Finechem Corporation, toluene solvent) was added. The solution was placed in an stainless steel pipe to prepare Comparative Catalyst Composition 5.

Comparative Example 8

In a glove box under a nitrogen atmosphere, a predetermined amount (see Table 17) of [(C$_5$Me$_5$)$_2$GdN(SiMe$_3$)$_2$] prepared in Comparative Synthesis Example 2 was placed in a sample vial, and was dissolved with 6 mL of toluene. Next, a predetermined amount (see Table 17) of triisobutylaluminum and a predetermined amount (see Table 17) of N,N-dimethylanilinium tetrakis(pentafluorophenyl)borate (Chemical Formula) (CH$_3$)$_2$N(C$_6$H$_5$)[B(C$_6$F$_5$)$_4$] (made by Tosoh Finechem Corporation) were added. The solution was placed in an stainless steel pipe to prepare Comparative Catalyst Composition 6.

Comparative Examples 9 and 10

In a glove box under a nitrogen atmosphere, a predetermined amount (see Table 18) of [(C$_5$Me$_4$H)$_2$GdN(SiMe$_3$)$_2$] prepared in Comparative Synthesis Example 3 was placed in a sample vial, and was dissolved with 6 mL of toluene. Next, a predetermined amount (see Table 18) of MAO-3A (made by Tosoh Finechem Corporation, toluene solvent) was added. The solution was placed in an stainless steel pipe to prepare Comparative Catalyst Composition 7.

Comparative Example 11

In a glove box under a nitrogen atmosphere, a predetermined amount (see Table 19) of [(C$_5$Me$_4$H)$_2$GdN(SiMe$_3$)$_2$]

prepared in Comparative Synthesis Example 3 was placed in a sample vial, and was dissolved with 6 mL of toluene. Next, a predetermined amount (see Table 19) of N,N-dimethylanilinium tetrakis(pentafluorophenyl)borate (Chemical Formula) $(CH_3)_2N(C_6H_5)$ [B $(C_6F_5)_4$] (made by Tosoh Finechem Corporation), and then a predetermined amount (see Table 19) of triisobutylaluminum (made by Tosoh Finechem Corporation) were added. The solution was placed in an stainless steel pipe to prepare Comparative Catalyst Composition 8.

Comparative Examples 12 and 13

In a glove box under a nitrogen atmosphere, a predetermined amount (see Table 20) of $[(C_5H_5)Gd[N(SiMe_3)_2]_2]$ prepared in Comparative Synthesis Example 4 was placed in a sample vial, and was dissolved with 6 mL of toluene. Next, a predetermined amount (see Table 20) of N,N-dimethylanilinium tetrakis(pentafluorophenyl)borate (Chemical Formula) $(CH_3)_2N(C_6H_5)[B(C_6F_5)_4]$ (made by Tosoh Finechem Corporation), and then a predetermined amount (see Table 20) of triisobutylaluminum (made by Tosoh Finechem Corporation) were added. The solution was placed in an stainless steel pipe to prepare Comparative Catalyst Composition 9.

Comparative Example 14

In a glove box under a nitrogen atmosphere, a predetermined amount (see Table 21) of $[(C_5H_5)Nd[N(SiMe_3)_2]_2]$ prepared in Comparative Synthesis Example 5 was placed in a sample vial, and was dissolved with 6 mL of toluene. Next, a predetermined amount (see Table 21) of $(CH_3)_2N(C_6H_5)$ $[B(C_6F_5)_4]$ (made by Tosoh Finechem Corporation, toluene solvent) was added. The solution was placed in an stainless steel pipe to prepare Comparative Catalyst Composition 10.

Examples 1 to 53

A polymerization solvent (see Tables 1 to 13) and a 33% butadiene cyclohexane solution were placed in a 1.5 L autoclave made of stainless steel such that the total amount was 750 g, and were adjusted to have a predetermined concentration of butadiene.

While the monomer solution was being stirred in an oil bath, the reactor inner temperature was adjusted to a predetermined temperature. The prepared catalyst composition was fed by nitrogen under pressure into the reactor through an stainless steel pipe. After polymerization was performed for a predetermined period of time, ethanol was added to terminate polymerization. The polymer solution was extracted, was washed with a 1 N hydrochloric acid aqueous solution three times, and was reprecipitated with methanol. Then, 0.1% dibutylhydroxytoluene (BHT) was added, and the product was dried in vacuum at 50° C. Test conditions and the results are shown in Tables 1 to 13.

Comparative Examples 1 to 14

A polymerization solvent (see Tables 14 to 21) and a 33% butadiene cyclohexane solution were placed in a 1.5 L autoclave made of stainless steel such that the total amount was 750 g, and were adjusted to have a predetermined concentration of butadiene.

While the monomer solution was being stirred in an oil bath, the reactor inner temperature was adjusted to a predetermined temperature. The prepared comparative catalyst composition was fed by nitrogen under pressure into the reactor through an stainless steel pipe. After polymerization was performed for a predetermined period of time, ethanol was added to terminate polymerization. The polymer solution was extracted, was washed with a 1 N hydrochloric acid aqueous solution three times, and was reprecipitated with methanol. Then, 0.1% BHT was added, and the product was dried in vacuum at 50° C. Test conditions and the results are shown in Tables 14 to 21.

TABLE 1

| | | Catalyst preparation conditions | | | | Polymerization conditions | |
|---|---|---|---|---|---|---|---|
| | | Amount of catalyst | | | | | |
| No. | Catalyst composition | Nd[(μ-Me$_2$)AlMe$_2$]$_3$ | TMAO-210 | Diisobutylaluminum hydride | Diethylaluminum chloride | Polymerization solvent | Concentration of butadiene wt % |
| | | mmol | | | | | |
| Example 1 | Catalyst composition 1 | 0.21 | 42 | 0.88 | 0.42 | Cyclohexane | 10 |
| Example 2 | Catalyst composition 1 | 0.11 | 21 | 0.44 | 0.22 | Cyclohexane | 10 |
| Example 3 | Catalyst composition 1 | 0.11 | 21 | 0.44 | 0.22 | n-Hexane | 10 |
| Example 4 | Catalyst composition 1 | 0.11 | 21 | 0.44 | 0.22 | Cyclohexane | 10 |
| Example 5 | Catalyst composition 1 | 0.11 | 21 | 0.44 | 0.22 | Cyclohexane | 10 |
| Example 6 | Catalyst composition 1 | 0.21 | 42 | 0.88 | 0.42 | Toluene | 10 |
| Example 7 | Catalyst composition 1 | 0.11 | 21 | 0.44 | 0.22 | Cyclohexane | 10 |
| Example 8 | Catalyst composition 1 | 0.11 | 21 | 0.44 | 0.22 | Cyclohexane | 2.5 |
| Example 9 | Catalyst composition 1 | 0.11 | 21 | 0.44 | 0.22 | Cyclohexane | 2.5 |
| Example 10 | Catalyst composition 1 | 0.11 | 21 | 0.44 | 0.33 | Cyclohexane | 2.5 |
| Example 11 | Catalyst composition 1 | 0.11 | 21 | 0.44 | 0.28 | Cyclohexane | 2.5 |
| Example 12 | Catalyst composition 1 | 0.11 | 21 | 0.44 | 0.31 | Cyclohexane | 2.5 |

TABLE 1-continued

| No. | Catalyst composition | Nd[(μ-Me₂)AlMe₂]₃ | MMAO-3A | Alkylaluminum mmol | Diethylaluminum chloride | Polymerization solvent | Concentration of butadiene wt % |
|---|---|---|---|---|---|---|---|
| Example 13 | Catalyst composition 1 | 0.11 | 21 | 0.44 | 0.24 | Cyclohexane | 2.5 |
| Example 14 | Catalyst composition 1 | 0.11 | 21 | 0.44 | 0.39 | Cyclohexane | 2.5 |
| Example 15 | Catalyst composition 1 | 0.11 | 10 | 0.44 | 0.22 | Cyclohexane | 2.5 |

| No. | Starting temperature ° C. | Highest temperature ° C. | Polymerization time min | Conversion rate % | Number average molecular weight ×10000 | Weight average molecular weight ×10000 | Molecular weight distribution Mw/Mn | 1,4-cis bond cis | 1,4-trans bond trans | 1,2-vinyl bond vinyl |
|---|---|---|---|---|---|---|---|---|---|---|
| Example 1 | 5.4 | 22 | 60 | 98 | 18 | 56 | 3.1 | 99 | 0.7 | 0.3 |
| Example 2 | 10 | 32 | 60 | 99 | 36 | 82 | 2.2 | 99.2 | 0.4 | 0.4 |
| Example 3 | 10 | 28 | 60 | 98 | 29 | 74 | 2.6 | 99.1 | 0.6 | 0.3 |
| Example 4 | 10 | 26 | 60 | 100 | 30 | 74 | 2.4 | 99.1 | 0.5 | 0.4 |
| Example 5 | 10 | 31 | 60 |  | 37 | 89 | 2.4 | 99.1 | 0.4 | 0.4 |
| Example 6 | 5 | 19 | 60 | 98 | 17 | 55 | 3.2 | 99.1 | 0.5 | 0.4 |
| Example 7 | 10 | 33 | 60 | 98 | 42 | 113 | 2.7 | 99.3 | 0.3 | 0.4 |
| Example 8 | 7 | 7 | 60 | 73 | 25 | 80 | 3.2 | 99.4 | 0.3 | 0.4 |
| Example 9 | 40 | 40 | 7 | 90 | 10 | 29 | 2.9 | 98.2 | 1.3 | 0.5 |
| Example 10 | 20 | 20 | 120 | 92 | 13 | 74 | 5.5 | 99.1 | 0.5 | 0.4 |
| Example 11 | 20 | 20 | 60 | 85 | 15 | 66 | 4.3 | 99.1 | 0.4 | 0.4 |
| Example 12 | 20 | 20 | 180 | 96 | 14 | 80 | 5.9 | 99.0 | 0.6 | 0.4 |
| Example 13 | 20 | 20 | 120 | 96 | 14 | 64 | 4.7 | 98.9 | 0.6 | 0.5 |
| Example 14 | 20 | 20 | 240 | 90 | 10 | 85 | 8.5 | 99.1 | 0.5 | 0.4 |
| Example 15 | 20 | 20 | 20 | 79 | 11 | 52 | 4.68 | 99.0 | 0.6 | 0.4 |

TABLE 2

| No. | Catalyst composition | Nd[(μ-Me₂)AlMe₂]₃ | MMAO-3A | Alkylaluminum mmol | Diethylaluminum chloride | Polymerization solvent | Concentration of butadiene wt % |
|---|---|---|---|---|---|---|---|
| Example 16 | Catalyst composition 2 | 0.11 | 21 | 0.44 | 0.22 | Cyclohexane | 2.5 |
| Example 17 | Catalyst composition 3 | 0.11 | 21 | 1.76 | 0.22 | Cyclohexane | 2.5 |
| Example 18 | Catalyst composition 4 | 0.11 | 21 | 1.76 | 0.22 | Cyclohexane | 2.5 |

| No. | Starting temperature ° C. | Highest temperature ° C. | Polymerization time min | Conversion rate % | Number average molecular weight ×10000 | Weight average molecular weight ×10000 | Molecular weight distribution Mw/Mn | 1,4-cis bond cis | 1,4-trans bond trans | 1,2-vinyl bond vinyl |
|---|---|---|---|---|---|---|---|---|---|---|
| Example 16 | 20 | 20 | 60 | 99 | 73 | 162 | 2.2 | 99.0 | 0.6 | 0.4 |
| Example 17 | 20 | 20 | 60 | 98 | 75 | 167 | 2.2 | 98.9 | 0.7 | 0.4 |
| Example 18 | 20 | 20 | 60 | 98 | 68 | 170 | 2.5 | 98.9 | 0.8 | 0.3 |

TABLE 3

| No. | Catalyst composition | Catalyst preparation conditions - Amount of catalyst | | | | Polymerization conditions | |
|---|---|---|---|---|---|---|---|
| | | Nd[(μ-Me$_2$)AlMe$_2$]$_3$ | MMAO-3A | Diisobutylaluminum hydride mmol | Diethylaluminum chloride | Polymerization solvent | Concentration of butadiene wt % |
| Example 19 | Catalyst composition 5 | 0.11 | 21 | 0.44 | 0.22 | Cyclohexane | 10 |
| Example 20 | Catalyst composition 5 | 0.06 | 10 | 0.22 | 0.12 | Cyclohexane | 10 |
| Example 21 | Catalyst composition 5 | 0.11 | 10 | 0.44 | 0.22 | Cyclohexane | 10 |

| No. | Polymerization conditions - Polymerization temperature | | Polymerization time min | Conversion rate % | Results - Molecular weight (×10000) | | | Microstructure (%) | | |
|---|---|---|---|---|---|---|---|---|---|---|
| | Starting temperature °C. | Highest temperature °C. | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Example 19 | 10 | 24 | 30 | 99 | 28 | 63 | 2.3 | 98.9 | 0.8 | 0.3 |
| Example 20 | 10 | 18 | 60 | 98 | 31 | 72 | 2.3 | 99.2 | 0.6 | 0.2 |
| Example 21 | 10 | 22 | 30 | 99 | 29 | 61 | 2.1 | 99.1 | 0.7 | 0.2 |

TABLE 4

| No. | Catalyst composition | Catalyst preparation conditions - Amount of catalyst | | | | Polymerization conditions | |
|---|---|---|---|---|---|---|---|
| | | Nd[(μ-Me$_2$)AlMe$_2$]$_3$ | PBAO | Diisobutylaluminum hydride mmol | Diethylaluminum chloride | Polymerization solvent | Concentration of butadiene wt % |
| Example 22 | Catalyst composition 6 | 0.11 | 21 | 0.44 | 0.22 | Cyclohexane | 2.5 |
| Example 23 | Catalyst composition 6 | 0.11 | 21 | 0.44 | 0.2 | Cyclohexane | 2.5 |

| No. | Polymerization conditions - Polymerization temperature | | Polymerization time min | Conversion rate % | Results - Molecular weight (×10000) | | | Microstructure (%) | | |
|---|---|---|---|---|---|---|---|---|---|---|
| | Starting temperature °C. | Highest temperature °C. | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Example 22 | 20 | 20 | 60 | 99 | 22 | 65 | 3 | 98.8 | 0.9 | 0.3 |
| Example 23 | 20 | 20 | 60 | 99 | 25 | 67 | 2.7 | 98.8 | 0.8 | 0.4 |

TABLE 5

| No. | Catalyst composition | Catalyst preparation conditions - Amount of catalyst | | | | Polymerization conditions | |
|---|---|---|---|---|---|---|---|
| | | Nd[(μ-Me$_2$)AlMe$_2$]$_3$ | Borane or borate | Diisobutylaluminum hydride | Diethylaluminum chloride | Polymerization solvent | Concentration of butadiene |
| | | mmol | | | | | wt % |
| Example 24 | Catalyst composition 7 | 0.11 | 0.11 | 0.44 | 0.22 | Cyclohexane | 2.5 |
| Example 25 | Catalyst composition 8 | 0.11 | 0.11 | 0.44 | 0.22 | Cyclohexane | 2.5 |
| Example 26 | Catalyst composition 9 | 0.11 | 0.11 | 0.44 | 0.22 | Cyclohexane | 2.5 |
| Example 27 | Catalyst composition 10 | 0.11 | 0.11 | 0.44 | 0.22 | Cyclohexane | 2.5 |

| | Polymerization conditions - Polymerization temperature | | Polymerization time min | Conversion rate % | Results | | | Microstructure (%) | | |
|---|---|---|---|---|---|---|---|---|---|---|
| | | | | | Molecular weight (×10000) | | | | | |
| | Starting temperature °C. | Highest temperature °C. | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| No. | | | | | | | | | | |
| Example 24 | 20 | 20 | 60 | 98 | 21 | 55 | 2.6 | 98.9 | 1.0 | 0.1 |
| Example 25 | 20 | 20 | 60 | 99 | 23 | 67 | 2.9 | 99.0 | 0.8 | 0.2 |
| Example 26 | 20 | 20 | 60 | 96 | 31 | 82 | 2.6 | 98.7 | 1.1 | 0.2 |
| Example 27 | 20 | 20 | 60 | 92 | 24 | 69 | 2.9 | 98.8 | 0.9 | 0.3 |

TABLE 6

| No. | Catalyst composition | Catalyst preparation conditions - Amount of catalyst | | | | Polymerization conditions | | Polymerization temperature | |
|---|---|---|---|---|---|---|---|---|---|
| | | Nd[(μ-Me$_2$)AlMe$_2$]$_3$ | TMAO-210 | Diisobutylaluminum hydride | Metal halide | Polymerization solvent | Concentration of butadiene wt % | Starting temperature °C. | Highest temperature °C. |
| | | mmol | | | | | | | |
| Example 28 | Catalyst composition 11 | 0.11 | 0.11 | 0.44 | 0.22 | Cyclohexane | 2.5 | 20 | 20 |
| Example 29 | Catalyst composition 12 | 0.11 | 0.11 | 0.44 | 0.15 | Cyclohexane | 2.5 | 20 | 20 |

| No. | Polymerization time min | Conversion rate % | Results | | | Microstructure (%) | | |
|---|---|---|---|---|---|---|---|---|
| | | | Molecular weight (×10000) | | | | | |
| | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Example 28 | 60 | 99 | 28 | 62 | 2.2 | 99.0 | 0.7 | 0.3 |
| Example 29 | 60 | 99 | 31 | 66 | 2.1 | 99.1 | 0.6 | 0.3 |

TABLE 7

| No. | Catalyst composition | Catalyst preparation conditions — Amount of catalyst — Gd[(μ-Me2)AlMe2]3 or Y[(μ-Me2)AlMe2]3 | TMAO-210 mmol | Diisobutyl-aluminum hydride | Diethyl-aluminum chloride | Polymerization solvent | Concentration of butadiene wt % | Polymerization temperature — Starting temperature ° C. | Highest temperature ° C. |
|---|---|---|---|---|---|---|---|---|---|
| Example 30 | Catalyst composition 13 | 0.11 | 0.11 | 0.44 | 0.22 | Cyclohexane | 2.5 | 20 | 20 |
| Example 31 | Catalyst composition 14 | 0.11 | 0.11 | 0.44 | 0.22 | Cyclohexane | 2.5 | 20 | 20 |

| No. | Polymerization time h | Conversion rate % | Number average molecular weight ×10000 | Weight average molecular weight ×10000 | Molecular weight distribution Mw/Mn | 1,4-cis bond cis | 1,4-trans bond trans | 1,2-vinyl bond vinyl |
|---|---|---|---|---|---|---|---|---|
| Example 30 | 3 | 95 | 56 | 127 | 2.3 | 98.9 | 0.7 | 0.4 |
| Example 31 | 5 | 72 | 72 | 194 | 2.7 | 98.2 | 1.2 | 0.6 |

TABLE 8

| No. | Catalyst composition | Nd[(μ-Me$_2$)AlMe$_2$]$_3$ | TMAO-210 mmol | Diethyl-aluminum chloride | Polymerization solvent | Concentration of butadiene wt % | Starting temperature ° C. | Highest temperature ° C. |
|---|---|---|---|---|---|---|---|---|
| Example 32 | Catalyst composition 15 | 0.42 | 84 | 0.84 | Toluene | 10 | 40 | 51.7 |
| Example 33 | Catalyst composition 15 | 0.42 | 84 | 0.84 | Cyclohexane | 10 | 40 | 57.7 |
| Example 34 | Catalyst composition 15 | 0.42 | 84 | 0.84 | Octane | 10 | 40 | 57.2 |
| Example 35 | Catalyst composition 15 | 0.21 | 42 | 0.42 | Cyclohexane | 2.5 | 40 | 40 |
| Example 36 | Catalyst composition 15 | 0.21 | 42 | 0.42 | Cyclohexane | 2.5 | 60 | 60 |
| Example 37 | Catalyst composition 15 | 0.21 | 42 | 0.21 | Cyclohexane | 2.5 | 40 | 40 |
| Example 38 | Catalyst composition 15 | 0.21 | 42 | 0.63 | Cyclohexane | 2.5 | 40 | 40 |
| Example 39 | Catalyst composition 15 | 0.21 | 5.3 | 0.63 | Cyclohexane | 2.5 | 40 | 40 |
| Example 40 | Catalyst composition 15 | 0.21 | 5.3 | 0.63 | Cyclohexane | 2.5 | 40 | 40 |

TABLE 8-continued

| | | | Results | | | | | |
|---|---|---|---|---|---|---|---|---|
| | | | Molecular weight (×10000) | | | Microstructure (%) | | |
| | | | Number | Weight | | | | |
| No. | Polymerization time h | Conversion rate % | average molecular weight ×10000 | average molecular weight ×10000 | Molecular weight distribution Mw/Mn | 1,4-cis bond cis | 1,4-trans bond trans | 1,2-vinyl bond vinyl |
| Example 32 | 2 | 95.8 | 80 | 189 | 2.4 | 98.8 | 0.5 | 0.7 |
| Example 33 | 1.5 | 93.0 | 66 | 180 | 2.7 | 98.9 | 0.3 | 0.8 |
| Example 34 | 1 | 94.5 | 67 | 153 | 2.3 | 98.8 | 0.5 | 0.8 |
| Example 35 | 2 | 99.2 | 89 | 241 | 2.71 | 99.0 | 0.4 | 0.6 |
| Example 36 | 1 | 90.3 | 41 | 98 | 2.41 | 98.1 | 1.1 | 0.8 |
| Example 37 | 1 | 90.3 | 72 | 151 | 2.1 | 98.6 | 0.9 | 0.6 |
| Example 38 | 24 | 61.1 | 49 | 187 | 3.84 | 98.6 | 0.4 | 1.0 |
| Example 39 | 8 | 94.8 | 60 | 156 | 2.6 | 98.8 | 0.6 | 0.6 |
| Example 40 | 2.5 | 99.3 | 54 | 179 | 3.32 | 98.4 | 1.1 | 0.5 |

TABLE 9

| | Catalyst preparation conditions | | | | Polymerization conditions | | | |
|---|---|---|---|---|---|---|---|---|
| | | Amount of catalyst | | | | | Polymerization temperature | |
| No. | Catalyst composition | Nd[(μ-Me$_2$)AlMe$_2$]$_3$ | MMAO-3A mmol | Diethyl-aluminum chloride | Polymerization solvent | Concentration of butadiene wt % | Starting temperature ° C. | Highest temperature ° C. |
| Example 41 | Catalyst composition 16 | 0.42 | 84 | 0.84 | Cyclohexane | 10 | 40 | 55 |
| Example 42 | Catalyst composition 16 | 0.42 | 84 | 0.84 | Cyclohexane | 10 | 40 | 57 |
| Example 43 | Catalyst composition 16 | 0.42 | 84 | 0.84 | Cyclohexane | 10 | 40 | 61 |

| | | | Results | | | | | |
|---|---|---|---|---|---|---|---|---|
| | | | Molecular weight (×10000) | | | Microstructure (%) | | |
| | | | Number | Weight | | | | |
| No. | Polymerization time h | Conversion rate % | average molecular weight ×10000 | average molecular weight ×10000 | Molecular weight distribution Mw/Mn | 1,4-cis bond cis | 1,4-trans bond trans | 1,2-vinyl bond vinyl |
| Example 41 | 2 | 98.0 | 72 | 155 | 2.2 | 98.9 | 0.3 | 0.8 |
| Example 42 | 2 | 97.6 | 75 | 165 | 2.2 | 98.9 | 0.4 | 0.7 |
| Example 43 | 1 | 90.2 | 68 | 158 | 2.3 | 98.7 | 0.5 | 0.8 |

TABLE 10

| No. | Catalyst composition | Catalyst preparation conditions ||| Polymerization conditions ||||
|---|---|---|---|---|---|---|---|---|
| | | Amount of catalyst ||| | | Polymerization temperature ||
| | | Nd[(μ-Me$_2$)AlMe$_2$]$_3$ | PBAO mmol | Diethyl-aluminum chloride | Polymerization solvent | Concentration of butadiene wt % | Starting temperature ° C. | Highest temperature ° C. |
| Example 44 | Catalyst composition 17 | 0.42 | 84 | 0.84 | Cyclohexane | 10 | 40 | 56 |
| Example 45 | Catalyst composition 17 | 0.42 | 84 | 0.84 | Cyclohexane | 10 | 40 | 60 |

| No. | Results |||||||
|---|---|---|---|---|---|---|---|
| | Polymerization time h | Conversion rate % | Molecular weight (×10000) ||| Microstructure (%) |||
| | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Example 44 | 2 | 96.5 | 80 | 192 | 2.2 | 98.8 | 0.4 | 0.8 |
| Example 45 | 2 | 97.0 | 75 | 173 | 2.3 | 98.8 | 0.4 | 0.8 |

TABLE 11

| No. | Catalyst composition | Catalyst preparation conditions ||| Polymerization conditions ||||
|---|---|---|---|---|---|---|---|---|
| | | Amount of catalyst ||| | | Polymerization temperature ||
| | | Nd[(μ-Me$_2$)AlMe$_2$]$_3$ | Borane or borate mmol | Diethyl-aluminum chloride | Polymerization solvent | Concentration of butadiene wt % | Starting temperature ° C. | Highest temperature ° C. |
| Example 46 | Catalyst composition 18 | 0.21 | 0.21 | 0.42 | Cyclohexane | 2.5 | 40 | 40 |
| Example 47 | Catalyst composition 19 | 0.42 | 0.42 | 0.84 | Cyclohexane | 10 | 40 | 55 |
| Example 48 | Catalyst composition 20 | 0.21 | 0.21 | 0.42 | Cyclohexane | 2.5 | 40 | 40 |
| Example 49 | Catalyst composition 21 | 0.21 | 0.21 | 0.42 | Cyclohexane | 2.5 | 40 | 40 |

| No. | Results |||||||
|---|---|---|---|---|---|---|---|
| | Polymerization time h | Conversion rate % | Molecular weight (×10000) ||| Microstructure (%) |||
| | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Example 46 | 3 | 90.0 | 38 | 165 | 4.3 | 98.7 | 0.3 | 1.0 |
| Example 47 | 2 | 99.0 | 45 | 178 | 3.9 | 98.5 | 0.3 | 1.2 |

TABLE 11-continued

|  |  |  |  |  |  |  |  |  |
|---|---|---|---|---|---|---|---|---|
| Example 48 | 2 | 78.4 | 31 | 124 | 4.0 | 98.7 | 0.2 | 1.1 |
| Example 49 | 3 | 99.0 | 75 | 173 | 2.3 | 98.8 | 0.3 | 0.9 |

TABLE 12

| No. | Catalyst composition | Catalyst preparation conditions | | | Polymerization conditions | | | |
|---|---|---|---|---|---|---|---|---|
| | | Amount of catalyst | | | Polym- erization solvent | Concen- tration of butadiene wt % | Polymerization temperature | |
| | | Nd[(μ- Me$_2$)AlMe$_2$]$_3$ | TMAO- 210 mmol | Metal halide | | | Starting temperature ° C. | Highest temperature ° C. |
| Example 50 | Catalyst composition 22 | 0.21 | 42 | 0.42 | Cyclo- hexane | 2.5 | 40 | 40 |
| Example 51 | Catalyst composition 23 | 0.21 | 42 | 0.28 | Cyclo- hexane | 2.5 | 40 | 40 |

| | | | Results | | | | | |
|---|---|---|---|---|---|---|---|---|
| | | | Molecular weight (×10000) | | | | | |
| | | | Number | Weight | | Microstructure (%) | | |
| No. | Polym- erization time h | Con- version rate % | average molecular weight ×10000 | average molecular weight ×10000 | Molecular weight distribution Mw/Mn | 1,4- cis bond cis | 1,4- trans bond trans | 1,2- vinyl bond vinyl |
| Example 50 | 2 | 90.0 | 72 | 195 | 2.7 | 98.9 | 0.4 | 0.7 |
| Example 51 | 2 | 99.0 | 83 | 197 | 2.4 | 99.0 | 0.5 | 0.5 |

TABLE 13

| No. | Catalyst composition | Catalyst preparation conditions | | | Polymerization conditions | | | |
|---|---|---|---|---|---|---|---|---|
| | | Amount of catalyst | | | Polym- erization solvent | Concen- tration of butadiene wt % | Polymerization temperature | |
| | | Gd[(μ- Me$_2$)AlMe$_2$]$_3$ or Y[(μ- Me$_2$)AlMe$_2$]$_3$ | TMAO- 210 mmol | Diethyl- aluminum chloride | | | Starting temperature ° C. | Highest temperature ° C. |
| Example 52 | Catalyst composition 24 | 0.21 | 42 | 0.42 | Cyclo- hexane | 2.5 | 40 | 40 |
| Example 53 | Catalyst composition 25 | 0.21 | 42 | 0.42 | Cyclo- hexane | 2.5 | 40 | 40 |

| | | | Results | | | | | |
|---|---|---|---|---|---|---|---|---|
| | | | Molecular weight (×10000) | | | | | |
| | | | Number | Weight | | Microstructure (%) | | |
| No. | Polym- erization time h | Con- version rate % | average molecular weight ×10000 | average molecular weight ×10000 | Molecular weight distribution Mw/Mn | 1,4- cis bond cis | 1,4- trans bond trans | 1,2- vinyl bond vinyl |
| Example 52 | 6 | 90.0 | 53 | 195 | 3.7 | 98.9 | 0.3 | 0.6 |
| Example 53 | 12 | 76.2 | 72 | 215 | 2.9 | 97.4 | 0.5 | 2.1 |

TABLE 14

| No. | Catalyst composition | Catalyst preparation conditions | | | Polymerization conditions | | |
|---|---|---|---|---|---|---|---|
| | | Amount of catalyst | | | | | Polymerization starting temperature ° C. |
| | | Nd | Diisobutyl-aluminum hydride mmol | Diethyl-aluminum chloride | Polymerization solvent | Concentration of butadiene wt % | |
| Comparative Example 1 | Comparative catalyst composition 1 | 0.63 | 5.25 | 1.89 | Cyclohexane | 10 | 0 |
| Comparative Example 2 | Comparative catalyst composition 2 | 2.7 | | 5.4 | Cyclohexane | 2.5 | 40 |

| No. | Results | | | | | | | |
|---|---|---|---|---|---|---|---|---|
| | Polymerization time h | Conversion rate % | Molecular weight (×10000) | | | Microstructure (%) | | |
| | | | Number average molecular weight ×10000 | Weight average molecular weight ×10000 | Molecular weight distribution Mw/Mn | 1,4-cis bond cis | 1,4-trans bond trans | 1,2-vinyl bond vinyl |
| Comparative Example 1 | 2 | 83 | 7.5 | 36 | 4.8 | 97 | 2.8 | 0.4 |
| Comparative Example 2 | 1 | 96 | 20 | 153 | 7.5 | 94.9 | 4.8 | 0.3 |

TABLE 15

| No. | Catalyst composition | Catalyst preparation conditions | | | Polymerization conditions | | | Results | | Microstructure |
|---|---|---|---|---|---|---|---|---|---|---|
| | | Amount of catalyst | | | | | | | | |
| | | [(i-PrC5H4)2GdN(SiMe3)2] mmol | (C6H5)3C[B(C6F5)4] | Diisobutyl-aluminum hydride | Polymerization solvent | Concentration of butadiene wt % | Polymerization starting temperature ° C. | Polymerization time h | Conversion rate % | (%) 1,4-cis bond cis |
| Comparative Example 3 | Comparative catalyst composition 3 | 0.16 | 0.16 | 0.32 | Toluene | 15 | 0 | 18 | 85 | 99.1 |
| Comparative Example 4 | Comparative catalyst composition 3 | 0.21 | 0.21 | 0.42 | Toluene | 20 | −20 | 120 | 96 | 100 |
| Comparative Example 5 | Comparative catalyst composition 3 | 0.21 | 0.21 | 0.42 | Toluene | 20 | 25 | 1 | 99 | 94.5 |

TABLE 16

| No. | Catalyst preparation conditions | | Polymerization conditions | | | |
|---|---|---|---|---|---|---|
| | Catalyst composition | Amount of catalyst [(i-PrC5H4)2GdN(SiMe3)2] mmol | MMAO-3A | Polymerization solvent | Concentration of butadiene wt % | Polymerization starting temperature ° C. |
| Comparative Example 6 | Comparative catalyst composition 4 | 0.74 | 70.4 | Toluene | 20 | 25 |

| | Results | | | | | |
|---|---|---|---|---|---|---|
| | | | Molecular weight (×10000) | | | Microstructure (%) |
| No. | Polymerization time h | Conversion rate % | Number average molecular weight ×10000 | Weight average molecular weight ×10000 | Molecular weight distribution Mw/Mn | 1,4-cis bond cis |
| Comparative Example 6 | 3 | 58 | 27.7 | 77.6 | 2.8 | 94 |

TABLE 17

| No. | Catalyst preparation conditions Catalyst composition | Amount of catalyst [(C5Me4H)2GdN(SiMe3)2] mmol | MMAO3A or (CH3)2N(C6H5)[B(C6F5)4] | Triisobutyl-aluminum | Polymerization solvent | Concentration of butadiene wt % | Polymerization starting temperature ° C. |
|---|---|---|---|---|---|---|---|
| Comparative Example 7 | Comparative catalyst composition 5 | 0.74 | 70.4 | | Toluene | 10 | 40 |
| Comparative Example 8 | Comparative catalyst composition 6 | 0.74 | 0.74 | 7.04 | Toluene | 10 | 40 |

| | Results | | | | | |
|---|---|---|---|---|---|---|
| | | | Molecular weight (×10000) | | | Microstructure (%) |
| No. | Polymerization time h | Conversion rate % | Number average molecular weight ×10000 | Weight average molecular weight ×10000 | Molecular weight distribution Mw/Mn | 1,4-cis bond cis |
| Comparative Example 7 | 1 | 99 | 24 | 75 | 3.1 | 94.3 |
| Comparative Example 8 | 1.5 | 99 | 24 | 68 | 3 | 93.2 |

TABLE 18

| No. | Catalyst preparation conditions Catalyst composition | Amount of catalyst [(C5Me4H)2GdN(SiMe3)2] mmol | MMAO-3A | Polymerization conditions | | |
|---|---|---|---|---|---|---|
| | | | | Polymerization solvent | Concentration of butadiene wt % | Polymerization starting temperature ° C. |
| Comparative Example 9 | Comparative catalyst composition 7 | 0.74 | 70.4 | Toluene | 20 | 25 |
| Comparative Example 10 | Comparative catalyst composition 7 | 0.74 | 70.4 | Toluene | 20 | 40 |

| No. | Results | | | | | |
|---|---|---|---|---|---|---|
| | Polymerization time h | Conversion rate % | Molecular weight (×10000) | | | Microstructure (%) 1,4-cis bond cis |
| | | | Number average molecular weight ×10000 | Weight average molecular weight ×10000 | Molecular weight distribution Mw/Mn | |
| Comparative Example 9 | 1.5 | 99 | 53.5 | 112 | 2.1 | 98.6 |
| Comparative Example 10 | 1 | 99 | 24 | 65 | 2.7 | 93.8 |

TABLE 19

| No. | Catalyst preparation conditions Catalyst composition | Amount of catalyst [(C5Me4H)2GdN(SiMe3)2] mmol | (CH3)2N(C6H5)[B(C6F5)] | Triisobutyl-aluminum | Polymerization conditions | | |
|---|---|---|---|---|---|---|---|
| | | | | | Polymerization solvent | Concentration of butadiene wt % | Polymerization starting temperature ° C. |
| Comparative Example 11 | Comparative catalyst composition 8 | 0.74 | 0.74 | 7.04 | Toluene | 20 | 25 |

| No. | Results | | | | | |
|---|---|---|---|---|---|---|
| | Polymerization time h | Conversion rate % | Molecular weight (×10000) | | | Microstructure (%) 1,4-cis bond cis |
| | | | Number average molecular weight ×10000 | Weight average molecular weight ×10000 | Molecular weight distribution Mw/Mn | |
| Comparative Example 11 | 24 | 10 | 24 | 55 | 2.3 | 98.2 |

TABLE 20

| No. | Catalyst composition | Catalyst preparation conditions | | | Polymerization conditions | | |
|---|---|---|---|---|---|---|---|
| | | Amount of catalyst [(C5H5)2GdN(SiMe3)2] mmol | (CH3)2N(C6H5)[B(C6F5)] | Triisobutyl-aluminum | Polymerization solvent | Concentration of butadiene wt % | Polymerization starting temperature ° C. |
| Comparative Example 12 | Comparative catalyst composition 9 | 0.74 | 0.74 | 7.04 | Toluene | 20 | 25 |
| Comparative Example 13 | Comparative catalyst composition 9 | 0.74 | 0.74 | 7.04 | Toluene | 20 | 40 |

| | | | Results | | | |
|---|---|---|---|---|---|---|
| | | | | Molecular weight (×10000) | | Microstructure (%) |
| No. | Polymerization time h | Conversion rate % | Number average molecular weight ×10000 | Weight average molecular weight ×10000 | Molecular weight distribution Mw/Mn | 1,4-cis bond cis |
| Comparative Example 12 | 1 | 60 | 58 | 128 | 2.2 | 99.3 |
| Comparative Example 13 | 1 | 99 | 34 | 88 | 2.6 | 95.3 |

TABLE 21

| No. | Catalyst composition | Catalyst preparation conditions | | | Polymerization conditions | | |
|---|---|---|---|---|---|---|---|
| | | Amount of catalyst [(C5Me4H)2NdN(SiMe3)2] mmol | (CH3)2N(C6H5)[B(C6F5)] | Triisobutyl-aluminum | Polymerization solvent | Concentration of butadiene wt % | Polymerization starting temperature ° C. |
| Comparative Example 14 | Comparative catalyst composition 10 | 0.74 | 0.74 | 7.04 | Toluene | 20 | 25 |

| | | | Results | | | |
|---|---|---|---|---|---|---|
| | | | | Molecular weight (×10000) | | Microstructure (%) |
| No. | Polymerization time h | Conversion rate % | Number average molecular weight ×10000 | Weight average molecular weight ×10000 | Molecular weight distribution Mw/Mn | 1,4-cis bond cis |
| Comparative Example 14 | 3 | 76 | 36 | 68 | 1.9 | 95 |

INDUSTRIAL APPLICABILITY

Use of the catalyst according to the present invention can efficiently provide a conjugated polydiene having a high cis content of 98% or more. Such diene polymers having a high cis content are suitably used in applications of tires or the like.

The invention claimed is:

1. A catalyst composition, comprising (i) component (a), (ii) component (b) or (d), and (iii) component (c), wherein:
the component (a) is a lanthanoid-aluminum crosslinked complex having a structure represented by the following formula (1) or (2):

Formula (1)

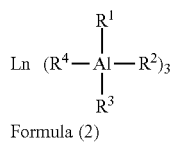

Formula (2)

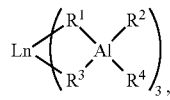

wherein Ln represents one selected from the group consisting of lanthanoid elements, Sc, and Y; and $R^1$ to $R^4$ may be the same or different, and represent one selected from the group consisting of a hydrogen atom, an alkyl group having 1 to 8 carbon atoms, an alkylsilyl group, an alkyloxy group, and a dialkylamide group;

the component (b) is an alkylaluminum compound represented by a formula $H_nAlR^{10}{}_{3-n}$ wherein $R^{10}$ may be the same or different, and represents an alkyl group having 1 to 8 carbon atoms or an alkenyl group having 1 to 8 carbon atoms; and n represents an integer of 0 to 3;

the component (c) is one or more compounds selected from the group consisting of metal halide compounds and halosilyl compounds; and the component (d) is one or more compounds selected from the group consisting of aluminum oxy compounds represented by the following formula (3) or (4), borane compounds and borate compounds:

Formula (3)

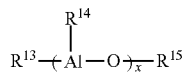

Formula (4)

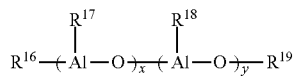

wherein $R^{13}$ to $R^{19}$ may be the same or different, and represent a hydrogen atom or an alkyl group having 1 to 8 carbon atoms; and x and y represent an integer of 1 to 10000.

2. The catalyst composition according to claim 1, wherein the catalyst composition comprises the components (a), (d), and (c).

3. The catalyst composition according to claim 1, wherein the alkylaluminum compound comprises a compound represented by a formula $H_nAlR^{20}{}_{3-n}$ wherein $R^{20}$ represents an alkyl group having 1 to 8 carbon atoms; and n represents an integer of 0 to 3.

4. The catalyst composition according to claim 1, wherein the alkylaluminum compound comprises diisobutylaluminum hydride or triisobutylaluminum.

5. The catalyst composition according to claim 1, wherein the metal halide compound comprises an aluminum halide compound.

6. The catalyst composition according to claim 1, wherein the aluminum oxy compound comprises methylaluminoxane.

7. The catalyst composition according to claim 2, wherein the metal halide compound comprises an aluminum halide compound.

8. The catalyst composition according to claim 2, wherein the aluminum oxy compound comprises methylaluminoxane.

9. A method of producing a polydiene compound having a cis-1,4-bond content of 98% or more, comprising:
a step of polymerizing a conjugated diene monomer with the catalyst composition according to claim 1.

10. A method of producing a polydiene compound, comprising:
a step of polymerizing a conjugated diene monomer with the catalyst composition according to claim 1, and reacting the resultant polymer with a compound comprising one selected from the group consisting of a carbonyl group, an imide group, and an epoxy group.

11. A method of producing a polydiene compound having a cis-1,4-bond content of 98% or more, comprising:
a step of polymerizing a conjugated diene monomer with the catalyst composition according to claim 2.

12. A method of producing a polydiene compound, comprising:
a step of polymerizing a conjugated diene monomer with the catalyst composition according to claim 2, and reacting the resultant polymer with a compound comprising one selected from the group consisting of a carbonyl group, an imide group, and an epoxy group.

13. The catalyst composition according to claim 1, wherein the catalyst composition comprises the components (a), (b), and (c).

14. The catalyst composition according to claim 1, wherein the catalyst composition comprises the components (a), (b), (c), and (d).

* * * * *